US009124613B2

(12) United States Patent
Nagami et al.

(10) Patent No.: US 9,124,613 B2
(45) Date of Patent: *Sep. 1, 2015

(54) INFORMATION STORAGE SYSTEM INCLUDING A PLURALITY OF STORAGE SYSTEMS THAT IS MANAGED USING SYSTEM AND VOLUME IDENTIFICATION INFORMATION AND STORAGE SYSTEM MANAGEMENT METHOD FOR SAME

(71) Applicant: HITACHI, LTD., Tokyo (JP)

(72) Inventors: Akihisa Nagami, Yokohama (JP); Koh Nakamichi, Kawasaki (JP); Yasunori Kaneda, Yokohama (JP); Hirokazu Ikeda, Yamato (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,069

(22) Filed: Nov. 19, 2014

(65) Prior Publication Data
US 2015/0142915 A1    May 21, 2015

Related U.S. Application Data

(63) Continuation of application No. 13/129,556, filed as application No. PCT/JP2011/002486 on Apr. 27, 2011, now Pat. No. 8,918,615.

(51) Int. Cl.
G06F 12/00      (2006.01)
H04L 29/08      (2006.01)
G06F 3/06       (2006.01)

(52) U.S. Cl.
CPC .......... *H04L 67/1097* (2013.01); *G06F 3/0607* (2013.01); *G06F 3/067* (2013.01); *G06F 3/0614* (2013.01); *G06F 3/0629* (2013.01); *G06F 3/0644* (2013.01); *G06F 3/0683* (2013.01)

(58) Field of Classification Search
CPC ...... G06F 3/0607; G06F 3/0629; G06F 3/067
See application file for complete search history.

(56) References Cited

U.S. PATENT DOCUMENTS

| 7,130,960 | B1 | 10/2006 | Kano |
| 2006/0031636 | A1 | 2/2006 | Mizuno |
| 2008/0059745 | A1 | 3/2008 | Tsukada et al. |

(Continued)

FOREIGN PATENT DOCUMENTS

| EP | 1 770 501 A2 | 4/2007 |
| EP | 1 785 831 A2 | 5/2007 |

(Continued)

*Primary Examiner* — John Lane
(74) *Attorney, Agent, or Firm* — Volpe and Koenig, P.C.

(57) ABSTRACT

An embodiment of this invention is an information storage system comprising a plurality of storage systems connected to be able to communicate. Each of the plurality of storage systems includes default storage system identification information which is the same to the plurality of storage systems, common volume identification information for uniquely identifying volumes provided by the plurality of storage systems to a host computer among the plurality of storage systems, and a controller configured to return the default storage system identification information to the host computer in response to a request from the host computer and to process a read or write request to a volume accompanying the common volume identification information from the host computer.

5 Claims, 36 Drawing Sheets

(56) References Cited

U.S. PATENT DOCUMENTS

| | | |
|---|---|---|
| 2008/0082749 A1 | 4/2008 | Kumagai |
| 2008/0177947 A1 | 7/2008 | Eguchi et al. |
| 2009/0187721 A1 | 7/2009 | Ueoka et al. |
| 2009/0276594 A1 | 11/2009 | Fujii et al. |
| 2010/0318579 A1 | 12/2010 | Satoyama et al. |
| 2011/0055429 A1 | 3/2011 | Yamamoto et al. |
| 2011/0066801 A1 | 3/2011 | Sato |
| 2011/0078398 A1 | 3/2011 | Jess |
| 2012/0137096 A1 | 5/2012 | Maki et al. |
| 2012/0297159 A1 | 11/2012 | Honda et al. |

FOREIGN PATENT DOCUMENTS

| | | |
|---|---|---|
| JP | 2005-011277 A | 1/2005 |
| JP | 2008-040571 A | 2/2008 |
| JP | 2008-176627 A | 7/2008 |
| JP | 2008-233973 A | 10/2008 |
| JP | 2009-271666 A | 11/2009 |
| WO | 2010/085228 A1 | 7/2010 |
| WO | 2010084522 A1 | 7/2010 |

FIG. 11

STORAGE SYSTEM MANAGEMENT TABLE 100

| STORAGE SYSTEM ID 1001 | STORAGE SYSTEM VENDOR NAME 1002 | STORAGE SYSTEM MODEL NAME 1003 | STORAGE SYSTEM SERIAL NO. 1004 | DEFAULT VIRTUAL VENDOR NAME 1005 | DEFAULT VIRTUAL MODEL NAME 1006 | DEFAULT VIRTUAL SERIAL NO. 1007 | MANAGEMENT COMMUNICATION I/F ADDRESS 1008 |
|---|---|---|---|---|---|---|---|
| 1 | WXYZ | STORAGE100 | 1001 | WXYZ | VSTORAGE10000 | 10001 | 192.168.1.200 |
| 2 | WXYZ | STORAGE150 | 201 | WXYZ | VSTORAG10000 | 10001 | 192.168.1.201 |

FIG. 12

STORAGE SYSTEM PORT MANAGEMENT TABLE 110

| STORAGE SYSTEM ID 1101 | DATA I/O COMMUNICATION I/F NO. 1102 | USE 1103 | VIRTUAL DATA I/O COMMUNICATION I/F NO. 1104 | PORT ID 1105 | VIRTUAL PORT ID 1106 |
|---|---|---|---|---|---|
| 1 | 1A | FOR HOST | 1001A | 1x 00 xx 00 00 00 00 01 | 1x 00 xx 00 00 00 00 11 |
| 1 | 1B | FOR HOST | 1001B | 1x 00 xx 00 00 00 00 02 | 1x 00 xx 00 00 00 00 21 |
| 1 | 2A | FOR MIGRATION | 1002A | 10 00 xx 00 00 00 01 01 | 1x 00 xx 00 00 00 00 12 |
| 1 | 2B | FOR MIGRATION | 1002B | 10 00 xx 00 00 00 01 02 | 1x 00 xx 00 00 00 00 22 |
| 2 | 1A | FOR HOST | 2001A | 2x 00 xx 00 00 00 00 01 | 2x 00 xx 00 00 00 00 11 |
| 2 | 1B | FOR HOST | 2001B | 2x 00 xx 00 00 00 00 02 | 2x 00 xx 00 00 00 00 11 |
| 2 | 2A | FOR MIGRATION | 2002A | 12 00 xx 00 00 00 01 01 | 2x 00 xx 00 00 00 00 12 |
| 2 | 2B | FOR MIGRATION | 2002B | 12 00 xx 00 00 00 01 02 | 2x 00 xx 00 00 00 00 22 |

FIG. 13

STORAGE SYSTEM POOL MANAGEMENT TABLE 120

| 1201 POOL NAME | 1202 TOTAL CAPACITY | 1203 AMOUNT OF USAGE | 1204 STORAGE SYSTEM ID | 1205A CAPACITY | 1205B AMOUNT OF USAGE | 1205C CAPACITY THRESHOLD | 1206A IOPS | 1206B PERFORMANCE THRESHOLD | 1207A CONSTITUENT VOLUME ID | 1207B CAPACITY | 1207C AMOUNT OF USAGE |
|---|---|---|---|---|---|---|---|---|---|---|---|
| POOL1 | 100 GB | 15 GB | 1 | 30 GB | 5 GB | 60% | 100 IOPS | 1000 IOPS | 4 | 10 GB | 1 GB |
| | | | | | | | | | 5 | 10 GB | 2 GB |
| | | | | | | | | | 6 | 10 GB | 2 GB |
| | | | 2 | 70 GB | 10 GB | 50% | 2000 IOPS | 1500 IOPS | 7 | 10 GB | 1 GB |
| | | | | | | | | | 8 | 10 GB | 2 GB |
| | | | | | | | | | 9 | 10 GB | 2 GB |

FIG. 14

STORAGE SYSTEM USAGE MANAGEMENT TABLE

| STORAGE SYSTEM ID | TOTAL CAPACITY | CAPACITY THRESHOLD | AMOUNT OF USAGE | MEDIA ID | MEDIA TYPE | RAID STRUCTURE | CAPACITY | AMOUNT OF USAGE |
|---|---|---|---|---|---|---|---|---|
| 1 | 14100 GB | 60% | 6130 GB | 1 | SSD | 4D+1P | 100 GB | 30 GB |
| | | | | 2 | SAS | 4D+1P | 2000 GB | 100 GB |
| | | | | 3 | SATA | 4D+1P | 4000 GB | 2000 GB |
| | | | | 4 | SATA | 6D+2P | 8000 GB | 4000 GB |
| 2 | 200000 GB | 50% | 8300 GB | 1 | SAS | 4D+1P | 2000 GB | 100 GB |
| | | | | 2 | SAS | 4D+1P | 2000 GB | 200 GB |
| | | | | 3 | SATA | 6D+2P | 8000 GB | 4000 GB |
| | | | | 4 | SATA | 6D+2P | 8000 GB | 4000 GB |

FIG. 15

VIRTUAL STORAGE SYSTEM VOLUME MANAGEMENT TABLE 140

| VIRTUAL VOLUME NO. 1401 | CAPACITY 1402 | AMOUNT OF USAGE 1403 | VOLUME TYPE 1404 | STORAGE SYSTEM ID 1405 | VOLUME ID 1406 | MEDIA ID 1407 | VIRTUAL PORT NO. 1408A | ALTERNATE VIRTUAL PORT NO. 1408B |
|---|---|---|---|---|---|---|---|---|
| 1 | 10GB | 5GB | NORMAL | 1 | 1 | 1 | 1001A | 1002A |
| 2 | 10GB | 8GB | NORMAL | 1 | 2 | 2 | 1002A | |
| 3 | 10GB | 3GB | NORMAL | 2 | 1 | 1 | 2001B | 2002B |
| 4 | 40GB | 3GB | THIN PROVISIONING | 1 | 3 | | 1001A | |
| 5 | 40GB | 4GB | THIN PROVISIONING | 2 | 2 | | 2001A | |
| 6 | 10GB | 1GB | POOL | 1 | 4 | 1 | 1001A | |
| 7 | 10GB | 1GB | POOL | 1 | 5 | 2 | 1001A | |
| 8 | 10GB | 1GB | POOL | 1 | 6 | 3 | 1001A | |
| 9 | 10GB | 2GB | POOL | 2 | 3 | 1 | 1001A | |
| 10 | 10GB | 2GB | POOL | 2 | 4 | 2 | 2001A | |

Fig. 16

CONNECTION APPARATUS MANAGEMENT TABLE (150)

| CONNECTION APPARATUS ID (1501) | CONNECTION APPARATUS NAME (1502) | MANAGEMENT COMMUNICATION I/F ADDRESS (1503) | USE (1504) |
|---|---|---|---|
| SW1 | SWITCH100 | 192.168.1.250 | FOR HOST |
| SW2 | SWITCH200 | 192.168.1.251 | FOR MIGRATION |

Fig. 17

HOST COMPUTER MANAGEMENT TABLE (160)

| HOST ID (1601) | HOST IP (1602) | HOST-SIDE PORT ID (1603) |
|---|---|---|
| HOST1 | 192.168.1.100 | 5x 00 xx 00 00 00 00 01 |
| HOST2 | 192.168.1.101 | 8x 00 xx 00 00 00 00 02 |

Fig. 18

CONNECTIVITY-FROM-HOST MANAGEMENT TABLE (170)

| PORT ID (1701) | CONNECTION APPARATUS CONNECTIVITY (1702) | CONNECTABLE PORT ID (1703) | CONNECTIVITY (1704) |
|---|---|---|---|
| 5x 00 xx 00 00 00 00 01 | CHECKING | 1x 00 xx 00 00 00 00 11 | CHECKED |
| | | 1x 00 xx 00 00 00 00 21 | CHECKED |
| | | 1x 00 xx 00 00 00 00 12 | CHECKING |
| | | 1x 00 xx 00 00 00 00 22 | CHECKING |
| | | . . . | . . . |
| 8x 00 xx 00 00 00 00 02 | CHECKED | 1x 00 xx 00 00 00 00 11 | CHECKED |
| | | 1x 00 xx 00 00 00 00 21 | CHECKED |
| | | 1x 00 xx 00 00 00 00 12 | CONNECTION DISABLED |
| | | 1x 00 xx 00 00 00 00 22 | CONNECTION DISABLED |
| | | . . . | . . . |

Fig. 19

CONNECTIVITY-BETWEEN-STORAGES MANAGEMENT TABLE (180)

| STORAGE SYSTEM ID (1801) | PORT ID (1802) | CONNECTIVITY (1803) |
|---|---|---|
| 1 | 10 00 XX 00 00 00 01 01 | CHECKING |
| 1 | 10 00 XX 00 00 00 01 02 | CHECKED |
| 2 | 12 00 XX 00 00 00 01 01 | UNCHECKED |
| 2 | 12 00 XX 00 00 00 01 02 | ERROR |

Fig. 20

DEFAULT VIRTUAL VALUE MANAGEMENT TABLE (190)

| DEFAULT VIRTUAL VENDOR NAME (1901) | DEFAULT VIRTUAL MODEL NAME (1902) | DEFAULT VIRTUAL SERIAL NO (1903) |
|---|---|---|
| WXYZ | VSTORAGE10000 | 10001 |

Fig. 21

STORAGE SYSTEM VENDOR NAME MANAGEMENT TABLE (200)

| VENDOR NAME (2001) | DEFAULT VIRTUAL VENDOR NAME (2002) |
|---|---|
| WXYZ | WXYZ |

Fig. 22

STORAGE SYSTEM MODEL NAME MANAGEMENT TABLE ~210

| SYSTEM MODEL NAME ~2101 | DEFAULT VIRTUAL MODEL NAME ~2102 |
|---|---|
| STORAGE100 | VSTORAGE10000 |

Fig. 23

STORAGE SYSTEM SERIAL NO. MANAGEMENT TABLE ~220

| SERIAL NO. ~2201 | DEFAULT VIRTUAL SERIAL NO. ~2202 |
|---|---|
| 1001 | 10001 |

FIG. 24

STORAGE SYSTEM PORT MANAGEMENT TABLE 230

| DATA I/O COMMUNICATION I/F NO. 2301 | VIRTUAL DATA I/O COMMUNICATION I/F NO. 2302 | USE 2303 | PORT ID 2304 | VIRTUAL PORT ID 2305 |
|---|---|---|---|---|
| 1A | 1001A | FOR HOST | 1x 00 xx 00 00 00 00 01 | 1x 00 xx 00 00 00 00 11 |
| | | | | 1x 00 xx 00 00 00 00 21 |
| 1B | 1001B | FOR MIGRATION | 1x 00 xx 00 00 00 00 02 | 1x 00 xx 00 00 00 00 12 |
| | | | | 1x 00 xx 00 00 00 00 22 |

FIG. 25

VOLUME MANAGEMENT TABLE 240

| VOLUME ID 2401 | CAPACITY 2402 | TYPE 2403 | MEDIA ID 2404 | VIRTUAL VOLUME NO. 2405 | VIRTUAL VENDOR NAME 2406A | VIRTUAL MODEL NAME 2406B | VIRTUAL SERIAL NO. 2406C | VIRTUAL PORT NO. 2407A | ALTERNATE VIRTUAL PORT NO. 2407B | PORT NO. 2408A | ALTERNATE PORT NO. 2408B | CACHE ALLOWABILITY 2409 |
|---|---|---|---|---|---|---|---|---|---|---|---|---|
| 1 | 10GB | NORMAL | 1 | 1 | WXYZ | VSTORAGE 10000 | 10001 | 2001A | 2002A | 3A | 3A | ALLOWABLE |
| 2 | 10GB | NORMAL | 2 | 2 | WXYZ | VSTORAGE 10000 | 10001 | 1001A | 1002A | 1A | 2A | ALLOWABLE |
| 3 | 40GB | THIN PROVISIONING | - | 4 | WXYZ | VSTORAGE 10000 | 10001 | 1001A | 1002A | 1A | 2A | ALLOWABLE |
| 4 | 10GB | POOL | 1 | 6 | WXYZ | VSTORAGE 10000 | 10001 | 1001A | 2001A | 1A | 3A | UNALLOWABLE |
| 5 | 10GB | POOL | 2 | 7 | WXYZ | VSTORAGE 10000 | 10001 | 1001A | | 1A | | |
| 6 | 10GB | POOL | 3 | 8 | WXYZ | VSTORAGE 10000 | 10001 | 2001A | | 3A | | |

FIG. 26

THIN PROVISIONING POOL MANAGEMENT TABLE 250

| POOL ID 2501 | TOTAL CAPACITY 2502 | AMOUNT OF USAGE 2503 | CONSTITUENT VOLUME ID 2504 | CAPACITY 2505 | AMOUNT OF USAGE 2506 | PAGE NO. 2507 | STATUS 2508 |
|---|---|---|---|---|---|---|---|
| POOL1 | 30GB | 5GB | 4 | 10GB | 1GB | 1 | ALLOCATED |
| | | | | | | 2 | UNALLOCATED |
| | | | | | | 3 | UNALLOCATED |
| | | | | | | ... | ... |
| | | | 5 | 10GB | 2GB | 1 | ALLOCATED |
| | | | | | | 2 | ALLOCATED |
| | | | | | | 3 | UNALLOCATED |
| | | | | | | ... | ... |
| | | | 6 | 10GB | 2GB | 1 | ALLOCATED |
| | | | | | | 2 | ALLOCATED |
| | | | | | | 3 | UNALLOCATED |
| | | | | | | ... | ... |

Fig. 27

THIN PROVISIONING VOLUME MANAGEMENT TABLE (260)

| VOLUME ID (2601) | MAXIMUM CAPACITY (2602) | AMOUNT OF USAGE (2603) | POOL ID (2604) | CONSTITUENT VOLUME ID (2605) | PAGE NO. (2606) |
|---|---|---|---|---|---|
| 3 | 40GB | 5GB | POOL1 | 4 | 1 |
|  |  |  |  | 5 | 1 |
|  |  |  |  | 5 | 2 |
|  |  |  |  | 6 | 1 |
|  |  |  |  | 6 | 2 |
|  |  |  |  | ... | ... |

Fig. 28

MEDIA MANAGEMENT TABLE (270)

| MEDIA ID (2701) | MEDIA TYPE (2702) | RAID STRUCTURE (2703) | CAPACITY (2704) | AMOUNT OF USAGE (2705) |
|---|---|---|---|---|
| 1 | SSD | 4D+1P | 100GB | 30GB |
| 2 | SAS | 4D+1P | 2000GB | 100GB |
| 3 | SATA | 4D+1P | 4000GB | 2000GB |
| 4 | SATA | 6D+2P | 8000GB | 4000GB |

Fig. 29

MANAGEMENT COMMUNICATION I/F ADDRESS MANAGEMENT TABLE (280)

| MANAGEMENT COMMUNICATION I/F ADDRESS (2801) |
|---|
| 192.168.1.200 |

FIG. 30

CONNECTED STORAGE SYSTEM'S VOLUME MANAGEMENT TABLE 300

| ID 3001 | VOLUME ID 3002 | SYSTEM VENDOR NAME 3003 | SYSTEM MODEL NAME 3004 | SYSTEM SERIAL NO. 3005 | PORT ID 3006 | DATA I/O COMMUNICATION I/F NO. 3007 |
|---|---|---|---|---|---|---|
| 1 | 3 | WXYZ | vStorage10000 | 10001 | 1x 00 xx 00 00 00 00 11 | 1001A |

Fig. 31

MANAGEMENT COMMUNICATION I/F ADDRESS MANAGEMENT TABLE ~310

| MANAGEMENT COMMUNICATION I/F ADDRESS ~3101 | PORT ID ~3102 |
|---|---|
| 192.168.1.100 | 5x 00 xx 00 00 00 00 01 |

Fig. 32

CONNECTED EQUIPMENT MANAGEMENT TABLE ~400

| CONNECTION NO. ~4001 | PORT ID ~4002 | LAMP STATUS ~4003 |
|---|---|---|
| 1 | 1x 00 xx 00 00 00 00 11 | ON |
| 2 | 1x 00 xx 00 00 00 00 12 | ON |
| 3 | 2x 00 xx 00 00 00 00 11 | OFF |
| 4 | 2x 00 xx 00 00 00 00 12 | ON |
| 5 | 5x 00 xx 00 00 00 00 11 | ON |
| 6 | 5x 00 xx 00 00 00 00 12 | ON |
| 7 | 8x 00 xx 00 00 00 00 11 | ON |
| ... | ... | ... |

Fig. 33

ZONE CONFIGURATION MANAGEMENT TABLE ~410

| ZONE ID ~4101 | PORT ID ~4102 |
|---|---|
| 1 | 1x 00 xx 00 00 00 00 11 |
|   | 5x 00 xx 00 00 00 00 11 |
| 2 | 1x 00 xx 00 00 00 00 12 |
|   | 5x 00 xx 00 00 00 00 12 |
| ... | ... |

Fig. 34

MANAGEMENT COMMUNICATION I/F ADDRESS MANAGEMENT TABLE ~420

| MANAGEMENT COMMUNICATION I/F ADDRESS ~4201 |
|---|
| 192.168.1.250 |

INFORMATION STORAGE SYSTEM INCLUDING A PLURALITY OF STORAGE SYSTEMS THAT IS MANAGED USING SYSTEM AND VOLUME IDENTIFICATION INFORMATION AND STORAGE SYSTEM MANAGEMENT METHOD FOR SAME

CROSS REFERENCE TO RELATED APPLICATIONS

This application is a continuation of U.S. patent application Ser. No. 13/129,556, filed on May 16, 2011, which claims the benefit of PCT/JP2011/002486 filed on Apr. 27, 2011, which are incorporated by reference as if fully set forth.

TECHNICAL FIELD

This invention relates to an information storage system and a storage system management method and, in particular, relates to a management technique of a plurality of storage systems.

BACKGROUND ART

Recent drastic increase in the amount of information handled by computers promotes expansion of the scale of data centers hosting host computers and storage systems for processing information. Servers, storage systems, and networks installed in data centers have attained technological progress to reduce management costs on an individual apparatus basis.

For servers, with enhancement of performance in units of apparatus, an architecture implementing a virtualization mechanism in a highly-integrated blade-type apparatus is beginning to be employed to achieve load balancing among a plurality of servers. To storage systems, a design that stores consolidated massive data in a large-scaled storage system with high performance, high reliability, and high availability is applied, instead of storing massive data in a number of small storages. As to network equipment, increasing the number of connections per apparatus improves performance to bear increased traffic among systems.

In such circumstances, data centers come to face a problem of management cost for procuring individual apparatuses and constructing and operating large-scale systems. To reduce the cost, integrated systems including built-up systems with servers, storages, and networks are beginning to be proposed.

Such an integrated system includes built-up components of servers, storage systems, and networks with determined specifications; accordingly, if it is assumed to use it within the range of its specified performance, construction and operation costs can be reduced.

An issue to improve the system performance is management of storage systems. Because of difficulties in designing performance and capacity, and difficulties in building up a storage area network (SAN), a large-scale data center employs an administrator specialized in the storage system; accordingly, simplification is particularly desired and techniques are under development.

One of the techniques to achieve a large-scale storage system is a storage area network. A storage area network connects one or more storage systems to a plurality of host computers so that a plurality of host storages can share a huge capacity storage system. Such computer systems are currently widespread.

An advantage of such a computer system is an outstanding extendability: storage resources and computer resources can be easily added, deleted, or replaced at a later occasion. For a storage system that connects to a SAN, a storage system including RAID (Redundant Array of Independent Disk) structured storage apparatuses are commonly used.

A fibre channel switch included in the SAN provides a zoning function. A zone is a unit of logical separation of a fibre channel network. A scheme of this fibre channel zoning configures a zone with a group of network interfaces.

The network interfaces registered in a zone do not accept data transfer to and from network interfaces which are not registered in the zone. In other words, data transfer is available only among the network interfaces registered in the zone. The fibre channel switch can manage information on equipment connected to the SAN fabric, update the statuses in response to a log-in of new equipment or a log-out, and respond to a query about connection status.

PTL 1 in the citation list below discloses a system that connects a virtual storage system to a different external storage system having storage areas to provide a host computer with a storage area in the different storage system to be used as a virtual storage area in the virtual storage system; the technique is called external storage attachment technique.

PTL 2 discloses a storage system that transfers information in a logical unit (volume) in a migration source storage system so as to match the settings on a migration destination storage system to set configuration control information.

PTL 3 discloses a technique that assigns a global LDEV number common to a plurality of storage systems in addition to a local LDEV number within a storage system. PTL 4 discloses a thin provisioning technique that prohibits allocation of storage capacity to unwritten data areas to reduce redundancy in the storage capacity.

CITATION LIST

Patent Literature

[PTL 1]
   JP 2005-11277 A
[PTL 2]
   JP 2008-176627 A
[PTL 3]
   JP 2008-40571 A
[PTL 4]
   U.S. Pat. No. 7,130,960

SUMMARY OF INVENTION

Technical Problem

If system performance required for a storage system enlarges to exceed the performance of a single storage system, it is necessary to use a plurality of storage systems as a resource for expansion of the system performance and reduction in management costs. For a plurality of storage systems to provide a host computer with services as a single storage system, it is necessary that the host computer can recognize the plurality of storage systems as a single storage system and also uniquely locate the volumes in the plurality of storage systems.

The method disclosed in PTL 1 can increase the capacity of a storage system using an external storage system. However, in accessing the attached storage system, resources such as ports, CPUs, and cache memories in the original storage system are used all the time, so that performance cannot be expanded.

The method disclosed in PTL 2 can migrate a volume between storage systems connected to a host computer. However, the administrator is required to manage the connection among the host computer and the storage systems independently from volume allocation.

The method disclosed in PTL 3 can prevent LDEV numbers from coinciding with each other in migration of a volume between storage systems. However, a typical host computer refers to information on the storage systems in addition to the volume number to locate a volume. For this reason, if volume migration is executed on-line, the information on the storage system to which the volume belongs is changed, so that the driver of the host computer is affected.

Accordingly, desired is a technique that a plurality of storage systems appropriately provide a host computer with services as one storage system.

Solution to Problem

An aspect of the present invention is an information storage system comprising a plurality of storage systems connected to be able to communicate. Each of the plurality of storage systems includes assigned default storage system identification information which is the same to the plurality of storage systems, common volume identification information for uniquely identifying a volume provided by the plurality of storage systems to a first host computer among the plurality of storage systems, and a controller configured to return the default storage system identification information to the first host computer in response to a request from the first host computer and to process a read or write request to the volume accompanying the common volume identification information from the first host computer.

Advantageous Effects of Invention

According to an aspect of this invention, a plurality of storage systems can appropriately provide a host computer with services as a storage system. Other problems, configurations, and effects of this invention will be clarified in the following explanations on a preferred embodiment.

BRIEF DESCRIPTION OF DRAWINGS

FIG. 11 is a drawing illustrating a configuration example of a storage system management table in a management computer in the embodiment.

FIG. 12 is a drawing illustrating a configuration example of a storage system port management table in a management computer in the embodiment.

FIG. 13 is a drawing illustrating a configuration example of a storage system pool management table in a management computer in the embodiment.

FIG. 14 is a drawing illustrating a configuration example of a storage system usage management table in a management computer in the embodiment.

FIG. 15 is a drawing illustrating a configuration example of a virtual storage system volume management table in a management computer in the embodiment.

FIG. 16 is a drawing illustrating a configuration example of a connection apparatus management table in a management computer in the embodiment.

FIG. 17 is a drawing illustrating a configuration example of a host computer management table in a management computer in the embodiment.

FIG. 18 is a drawing illustrating a configuration example of a connectivity-from-host management table in a management computer in the embodiment.

FIG. 19 is a drawing illustrating a configuration example of a connectivity-between-storages management table in a management computer in the embodiment.

FIG. 20 is a drawing illustrating a configuration example of a default virtual value management table in a management computer in the embodiment.

FIG. 21 is a drawing illustrating a configuration example of a storage system vendor name management table in a storage system in the embodiment.

FIG. 22 is a drawing illustrating a configuration example of a storage system model name management table in a storage system in the embodiment.

FIG. 23 is a drawing illustrating a configuration example of a storage system serial number management table in a storage system in the embodiment.

FIG. 24 is a drawing illustrating a configuration example of a storage system port management table in a storage system in the embodiment.

FIG. 25 is a drawing illustrating a configuration example of a volume management table in a storage system in the embodiment.

FIG. 26 is a drawing illustrating a configuration example of a thin provisioning pool management table in a storage system in the embodiment.

FIG. 27 is a drawing illustrating a configuration example of a thin provisioning volume management table in a storage system in the embodiment.

FIG. 28 is a drawing illustrating a configuration example of a media management table in a storage system in the embodiment.

FIG. 29 is a drawing illustrating a configuration example of a management communication I/F address management table in a storage system in the embodiment.

FIG. 30 is a drawing illustrating a configuration example of a connected storage system's volume management table in a host computer in the embodiment.

FIG. 31 is a drawing illustrating a configuration example of a management communication I/F address management table in a host computer in the embodiment.

FIG. 32 is a drawing illustrating a configuration example of a connected equipment management table in a connection apparatus in the embodiment.

FIG. 33 is a drawing illustrating a configuration example of a zone configuration management table in a connection apparatus in the embodiment.

FIG. 34 is a drawing illustrating a configuration example of a management communication I/F address management table in a connection apparatus in the embodiment.

DESCRIPTION OF EMBODIMENTS

Hereinafter, an embodiment of this invention will be described with reference to the accompanying drawings. For clarity of explanation, the following descriptions and the accompanying drawings contain omissions and simplifications as appropriate. Throughout the drawings, like components are denoted by like reference signs and their repetitive explanation is omitted for clarity of explanation, if not necessary.

This embodiment describes a configuration that enables a plurality of storage system to provide host computers with services as one storage system. The system in this embodiment assigns the same storage system identification information (default identifier) to a plurality of storage system. Moreover, it assigns volume identification information unique within the plurality of storage systems to a volume.

A host computer locates a volume using the assigned storage system identification information and the volume identification information. For example, even if a volume is migrated from a storage system to another while the system is in operation, the host computer can read or write the volume in the destination storage system using the storage system identification information and the volume identification information.

Figure 1:
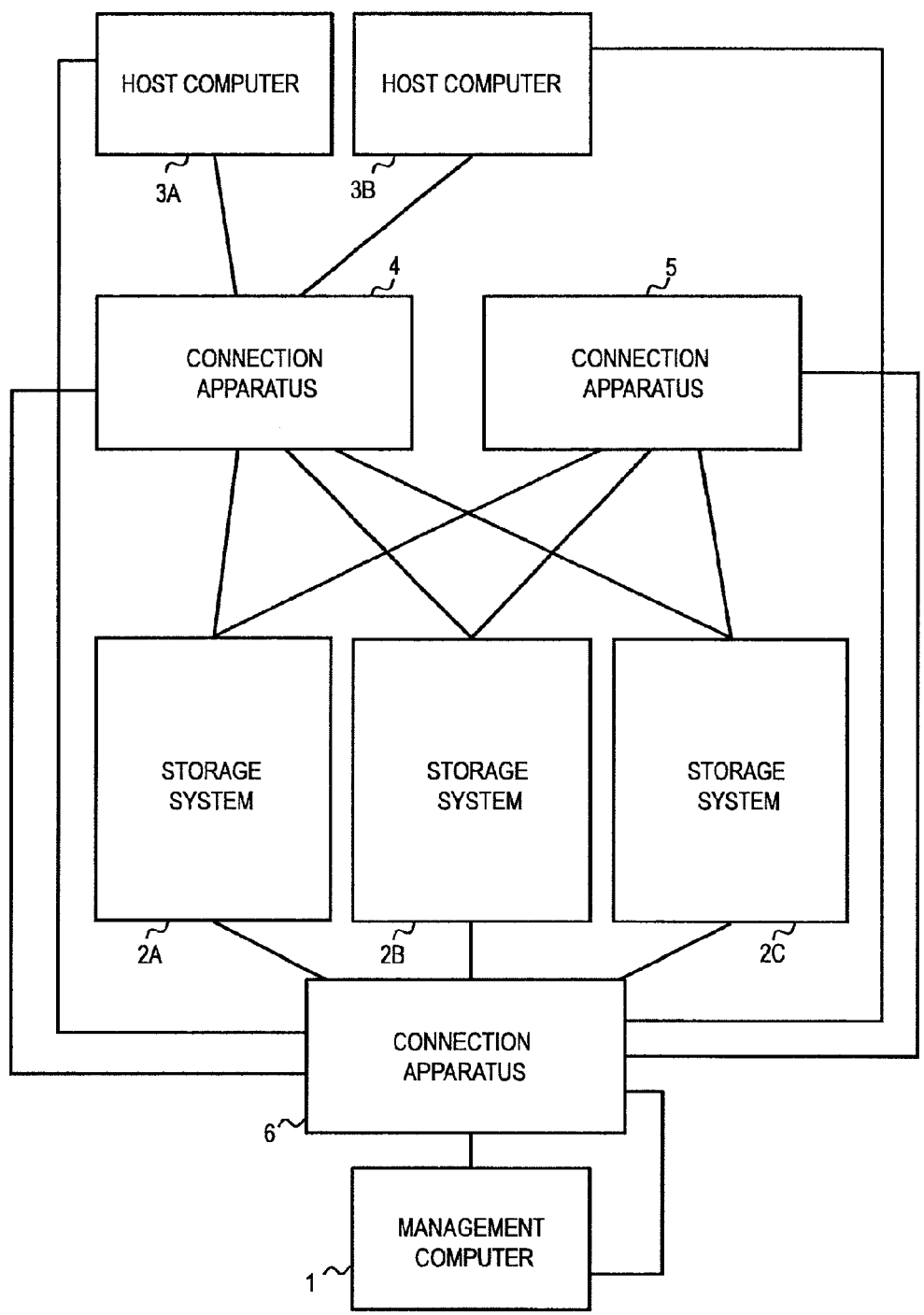
FIG. 1 is a configuration diagram of an overall computer system in an embodiment of this invention.

FIG. 1 is a diagram for illustrating an example of an overall configuration of a computer system in an embodiment of this invention. As illustrated in this diagram, the computer system comprises a management computer 1, a plurality of (three in the example of FIG. 1) storage systems 2A to 2C, one or more (two in the example of FIG. 1) host computers 3A and 3B, and three connection apparatuses 4 to 6.

Hereinafter, storage system(s) 2 indicates arbitrary storage system(s) in the computer system and host computer(s) 3 indicates arbitrary host computer(s) in the computer system.

The connection apparatus 4 transfers data I/O requests (requests for data input or output) from host computers 3 to storage systems 2. The connection apparatus 5 transfers data I/O requests between storage systems 2. The connection apparatus 6 transfers requests for management communication from the management computer 1 to the storage systems 2, the host computers 3, and the connection apparatuses 4 and 5.

This computer system configures a SAN (Storage Area Network) between the host computers 3 and the storage systems 2 with the connection apparatus 4, but the host computers 3 may be directly connected to the storage systems 2.

This computer system configures a SAN among the storage systems 2 with the connection apparatus 5, but the storage systems 2 may be directly connected to one another. The connection apparatus 6 provides a configuration where for the management computer 1 can connect to the overall computer system via an IP network, but the constituents of the system may be connected directly from the management computer 1.

The networks including the connection apparatuses 4 and 5 may be networks provided by physically the same apparatus but being logically independent. The networks including the connection apparatuses 4 and 5 may be IP networks configured with iSCSI (Internet Small Computer System Interface) or may be logically independent networks provided by the same apparatus providing the IP network provided by the connection apparatus 6. Moreover, the networks including the connection apparatuses 4, 5, and 6 may be included in a network configured with FCoE (Fibre Channel over Ethernet) and provided by the same apparatus.

Figure 2:
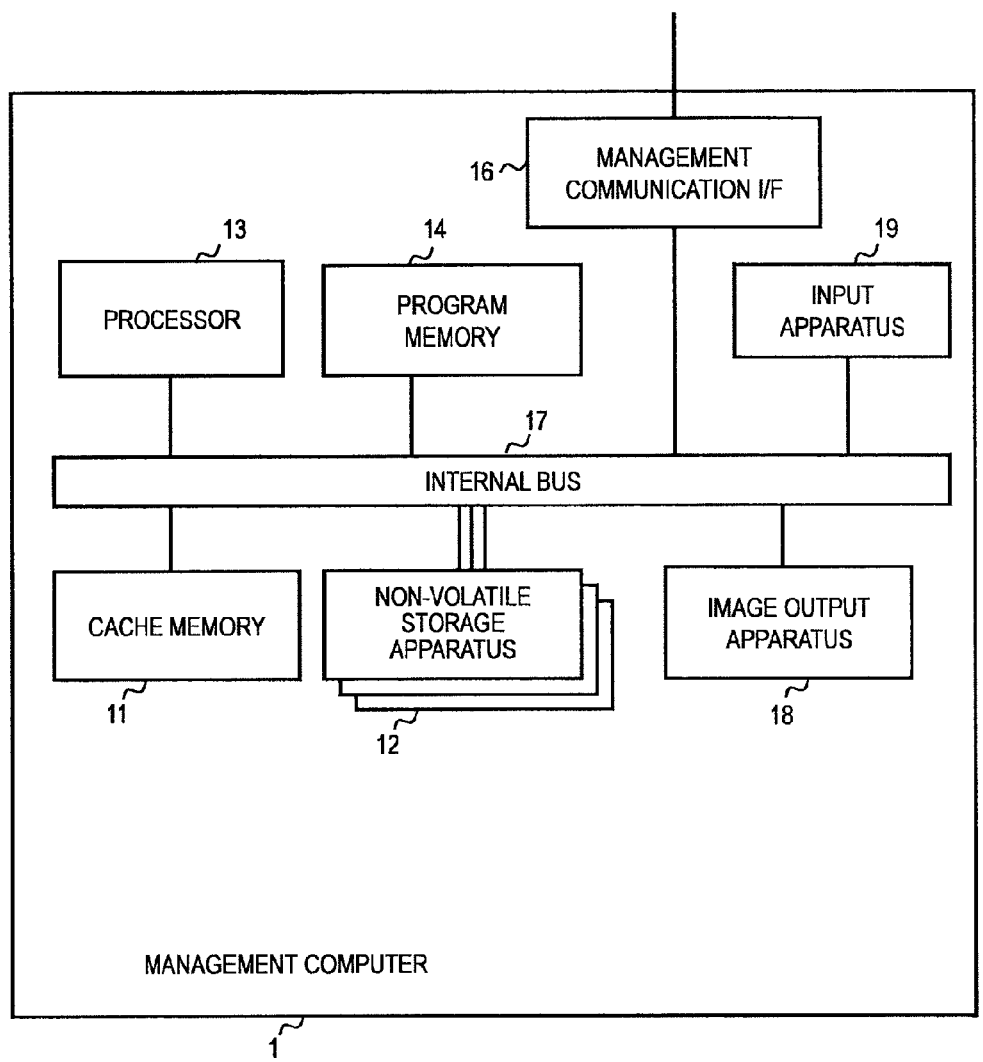
FIG. 2 is a diagram exemplifying a hardware configuration of a management computer in the embodiment.

FIG. 2 illustrates an example of a hardware configuration of the management computer 1. The management computer 1 is a computer comprising a cache memory 11, a non-volatile storage apparatus 12, a processor 13, a program memory 14, a management communication I/F 16, an internal bus 17, an image output apparatus 18, an input apparatus 19. The non-volatile storage apparatus 12 may be an external storage apparatus connected via a network.

The management computer 1 loads software such as an operating system (OS) and application programs stored in the non-volatile storage apparatus 12 to the program memory 14; the processor 13 retrieves them from the program memory 14 and executes them to provide predetermined functions. The processor 13 may include a plurality of chips or a plurality of packages. The same applies to the other apparatuses (including the storage systems 2).

The management computer 1 temporarily stores frequently used data in the cache memory 11 to enhance the processing speed. The management computer 1 includes an input apparatus 19 such as a keyboard, a mouse or both and an image output apparatus 18 such as a monitor. The input apparatus 19 accepts inputs from the administrator (user) and the image output apparatus 18 outputs information instructed by the processor 13. The management computer 1 further includes a management communication IF 16 for connecting to the connection apparatus 6.

In the configuration example of FIG. 1, a management system is configured with the management computer 1, but the management system may be configured with a plurality of computers: one may be a computer for display and the other plurality of computers may perform jobs equivalent to those in the management computer for speedy management and higher reliability.

Figure 3:
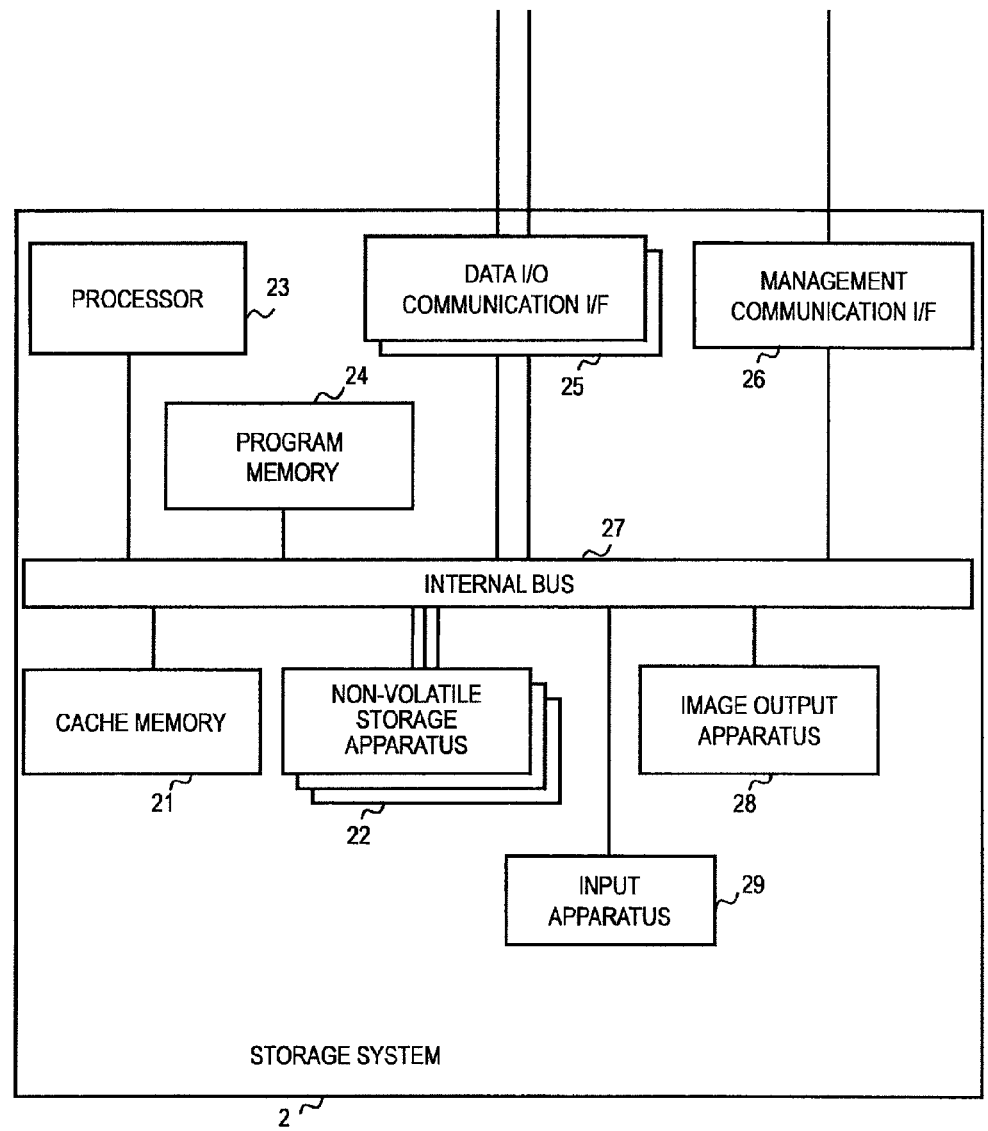
FIG. 3 is a diagram exemplifying a hardware configuration of a storage system in the embodiment.

FIG. 3 illustrates an example of hardware configuration of a storage system 2. The storage system 2 comprises a cache memory 21, a non-volatile storage apparatus 22, a processor 23, a program memory 24, a data I/O communication I/F 25, a management communication IF 26, an internal bus 27, an image output apparatus 28, and an input apparatus 29.

The storage system 2 loads software such as an OS and application programs stored in the non-volatile storage apparatus 22 to the program memory 24; the processor 23 retrieves them from the program memory 24 and executes them to provide predetermined functions. The processor 23 functions as a controller of the storage system 2. The storage system 2 stores frequently used data in the cache memory 21 to enhance the processing speed.

The storage system 2 includes an input apparatus 29 such as a keyboard, a mouse or both and an image output apparatus 28 such as a monitor. The input apparatus 29 accepts inputs from the administrator (user) and the image output apparatus 28 outputs information instructed by the processor 23. The storage system 2 includes one or more data I/O communication I/Fs 25 for connecting to the connection apparatuses 4 and 5 and a management communication I/F 26 for connecting to the connection apparatus 6. It should be noted that the data I/O communication I/Fs 25 and the management communication I/F 26 may be provided by physically the same apparatus.

For simplicity, FIG. 1 shows three storage systems 2 but the system may comprise two or more than three storage systems 2. A port ID unique in the computer system is assigned to the data I/O communication IF 25, and a plurality of virtual port IDs can be assigned using NPIV (N_Port ID Virtualization) or any other virtualization scheme.

The data I/O communication I/F 25 supports both of a target mode for receiving a read or write request from a host computer 3 and an initiator mode for sending a read or write request to a different storage system 2. The storage system 2 may have physically different data I/O communication I/Fs 25 for those modes, but a physically single I/F may logically satisfy the both functions.

Figure 4:
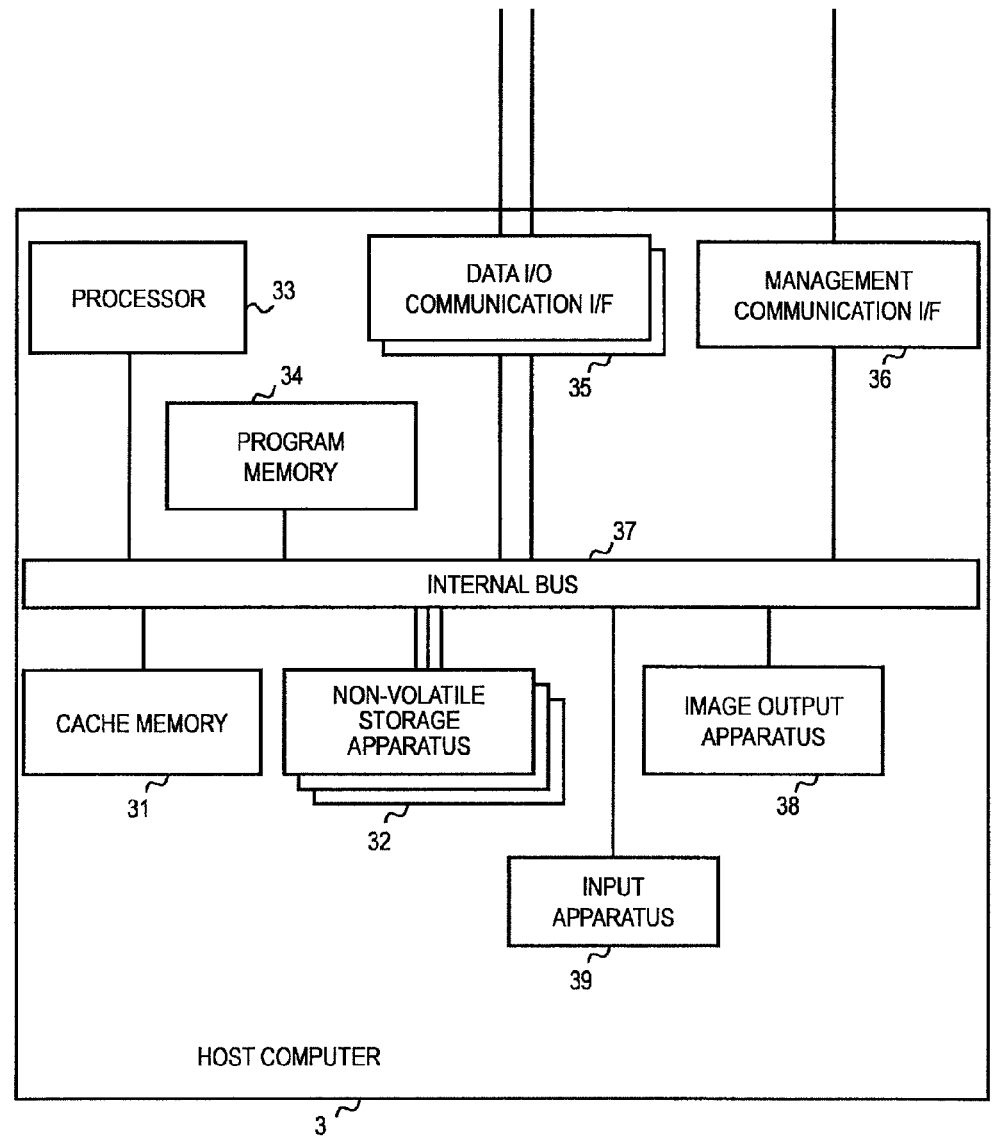
FIG. 4 is a diagram exemplifying a hardware configuration of a host computer in the embodiment.

FIG. 4 illustrates an example of a hardware configuration of a host computer 3. The host computer 3 is a computer comprising a cache memory 31, a non-volatile storage apparatus 32, a processor 33, a program memory 34, a data I/O communication I/F 35, a management communication I/F 36, an internal bus 37, an image output apparatus 38, and an input apparatus 39.

The host computer 3 loads software such as an OS and application programs stored in the non-volatile storage apparatus 32 to the program memory 34; the processor 33 retrieves them from the program memory 34 and executes them to provide predetermined functions. The processor 3 stores frequently used data in the cache memory 31 to enhance the processing speed.

The host computer 3 includes an input apparatus 39 such as a keyboard, a mouse or both and an image output apparatus 38 such as a monitor. The input apparatus 39 accepts inputs from the administrator (user) and the image output apparatus 38 outputs information instructed by the processor 33. The host computer 3 includes one or more data I/O communication I/Fs 35 for connecting to the connection apparatuses 4 and 5 and a management communication I/F 36 for connecting to the connection apparatus 6. The data I/O communication I/Fs 35 and the management communication I/F 36 may be provided by physically the same apparatus.

For simplicity, FIG. 1 shows two host computers 3 but the system may comprise any number of host computers 3. A port ID unique in the computer system is assigned to a data I/O communication I/F 35, and a plurality of virtual port IDs can be assigned using NPIV or any other virtualization scheme.

Figure 5:
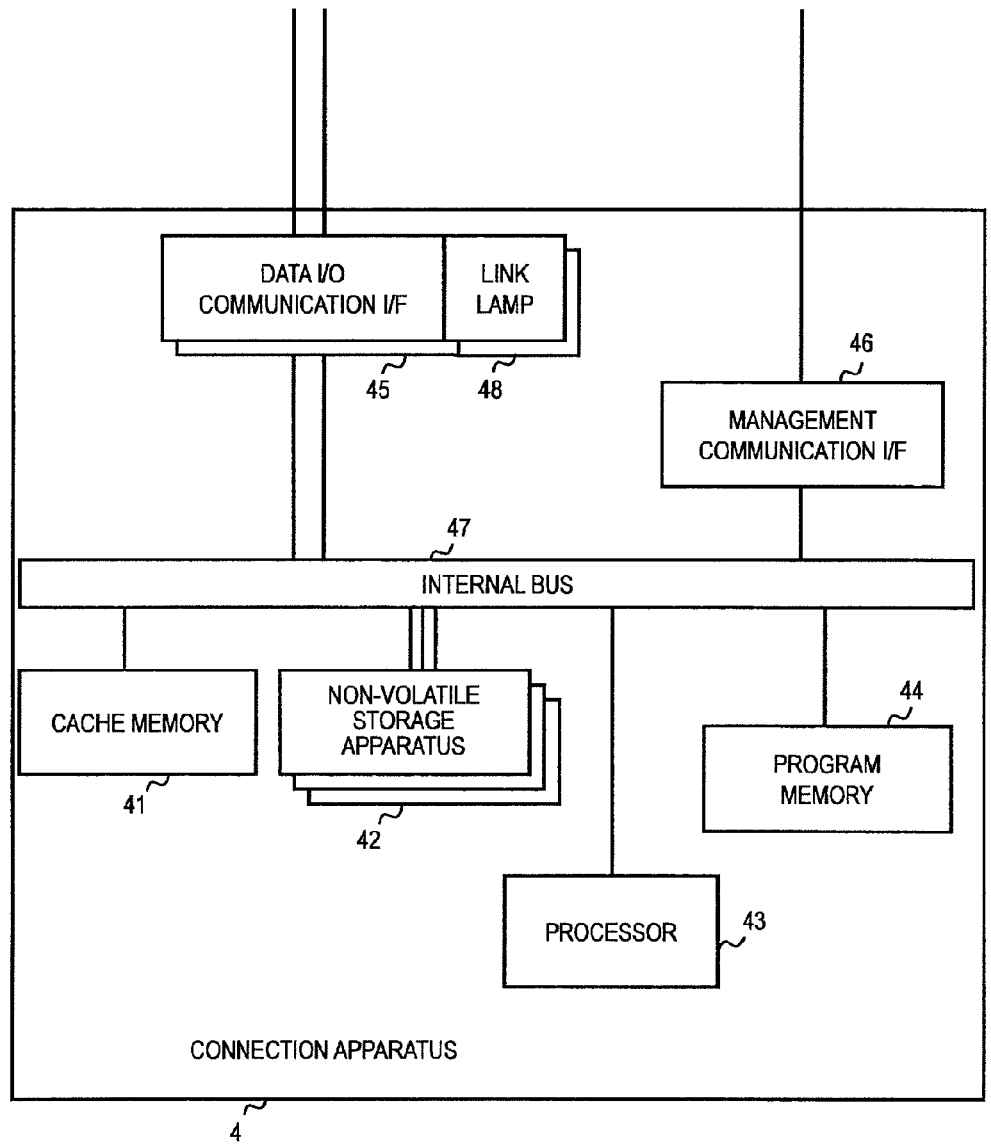
FIG. 5 is a diagram exemplifying a hardware configuration of a connection apparatus in the embodiment.

FIG. 5 illustrates an example of a hardware configuration of the connection apparatus 4. The connection apparatus 4 comprises a cache memory 41, a non-volatile storage apparatus 42, a processor 43, a program memory 44, a data I/O communication I/F 45, a management communication I/F 46, an internal bus 47, and link lamps 48.

The connection apparatus 4 loads software such as an OS and application programs stored in the non-volatile storage apparatus 42 to the program memory 44; the processor 43 retrieves them from the program memory 44 and executes them to provide predetermined functions. The connection apparatus 4 stores frequently used data in the cache memory 41 to enhance the processing speed. The connection apparatus 4 includes link lamps 48 having light-emitting elements such as LEDs to visualize the statuses of logical connections in the data I/O communication I/F 45. The connection apparatuses 5 and 6 have the same configuration as the connection apparatus 4.

Figure 6:
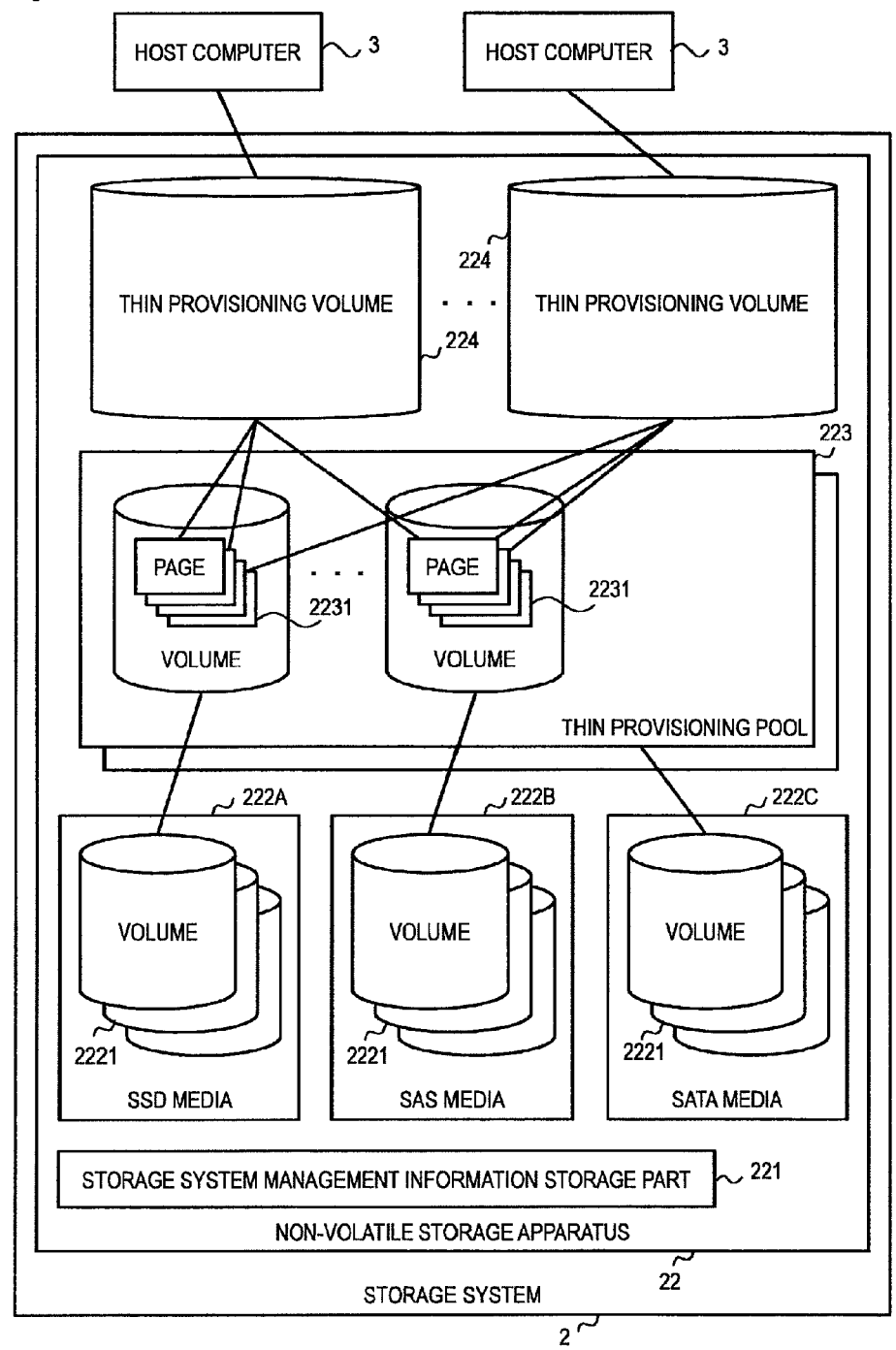
FIG. 6 is a diagram exemplifying a volume configuration of a non-volatile storage apparatus and stored information in the storage system in the embodiment.

FIG. 6 illustrates a configuration of a non-volatile storage apparatus 22 in a storage system 2. The non-volatile storage apparatus 22 includes a storage system management information storage part 221 and different types of media 222A to 222C equipped with non-volatile storage media. In this description, a group composed of one or more media drives is referred to as a medium. A medium or media 222 indicate an arbitrary medium or arbitrary media.

In the example of FIG. 6, a SSD (Solid State Drive) medium 222A which utilizes a flash memory of a semiconductor memory, a SAS (Serial Attached SCSI) medium 222B which includes a SAS interface, and a SATA (Serial Advanced Technology Attachment) medium 222C which includes a SATA interface are exemplified.

The storage system 2 provides one or more volumes (real volumes) 2221 which are formed of real storage areas provided by media 222 and readable and writable from a host computer 3 or a thin provisioning pool 223. A volume 2221 may be provided by a single taype of medium 222 or may be provided from a RAID (Redundant Arrays of Inexpensive Disks) configured by a plurality of types of media 222. Hereinafter, an example in which each volume 2221 is formed by using a single taype of medium 222 will be described.

In a thin provisioning pool 223, a volume 2221 selected out of volumes 2221 of the media 222 by the administrator (user) is divided into a plurality of pages 2231. The thin provisioning pool 223 is managed in units of page. A thin provisioning volume 224 is a virtual volume provided to a host computer 3 and the capacity is virtualized. Every time a host computer 3 writes data to its thin provisioning volume 224 to cause a need of a data storage area, the storage system 2 allocates a page 2231 to the thin provisioning volume 224.

Thin provisioning can make the capacity of a thin provisioning volume 224 recognized by a host computer 3 larger than the real capacity allocated to the thin provisioning volume 224 (the total capacity of all of the pages) and can make the real capacity to achieve the capacity allocated to the host computer 3 smaller than the allocated capacity.

Figure 7:
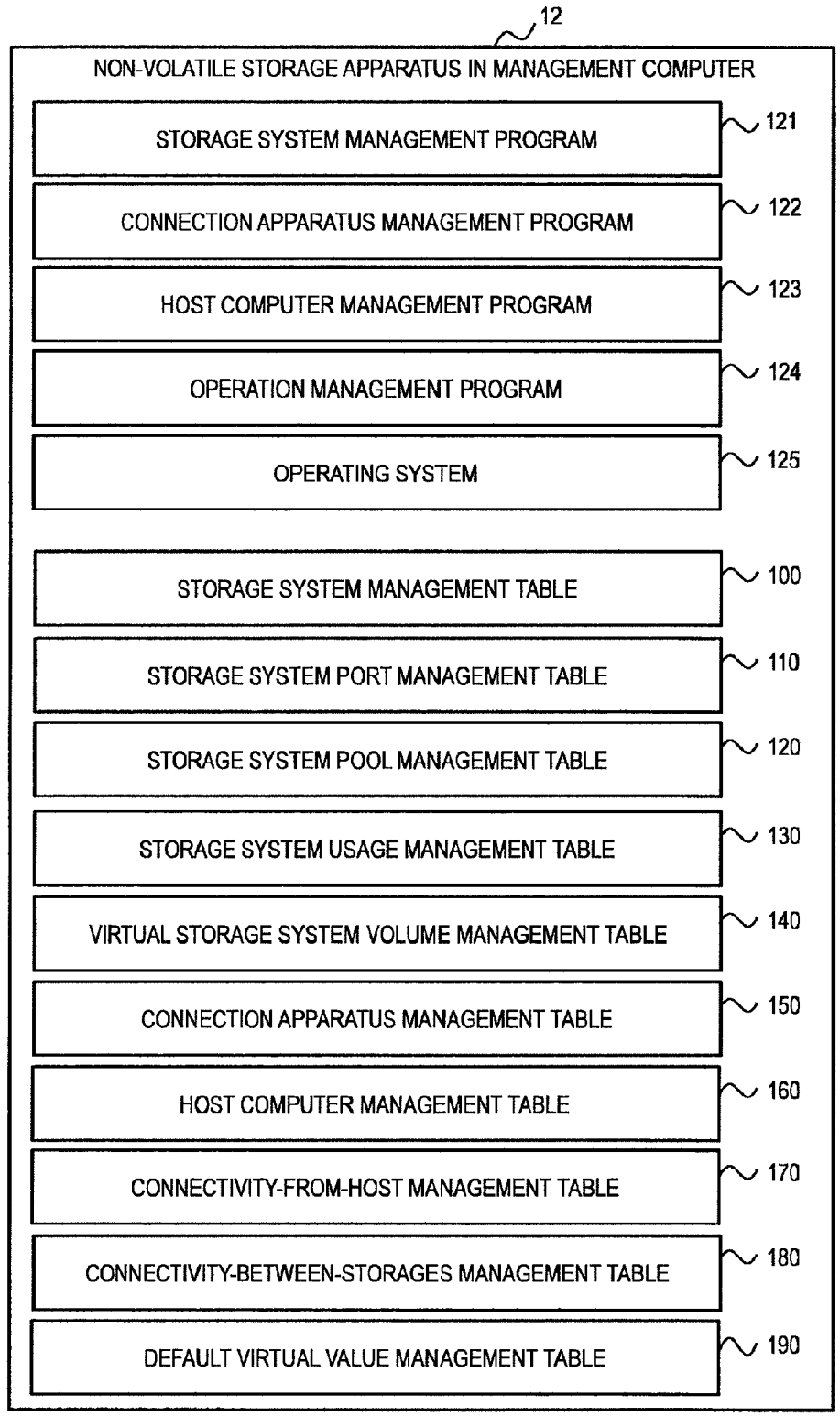
FIG. 7 is a drawing exemplifying information stored in a non-volatile storage apparatus in a management computer in the embodiment.

FIG. 7 illustrates information stored in the non-volatile storage apparatus 12 in the management computer 1. A storage system management program 121 checks the statuses of the storage systems 2 in the computer system and sets configuration information on them through communication via the connection apparatus 6 connected from the management communication I/F 16. A connection apparatus management program 122 checks the statuses of the connection apparatuses 4 and 5 in the computer system and sets configuration information on them through communication via the connection apparatus 6 connected from the management communication I/F 16.

A host computer management program 123 checks the statuses of the host computers 3 in the computer system and specifies configuration information on them through communication with agents 322 (refer to FIG. 9) in the host computers 3 via the connection apparatus 6 connected from the management communication I/F 16. An operation management program 124 designs volume allocation and executes other jobs with reference to tables in the non-volatile storage apparatus 12 in the management computer 1. The operation management program 124 further manages operations in the computer system in cooperation with various programs and provides the administrator with a user interface. An operating system 125 is a platform for executing the various programs and for managing various tables.

The programs are executed by the processor 13 to perform predetermined jobs using the storage apparatus and the management communication I/F 16. Accordingly, in this embodiment, the explanations having the subjects of program may be explanations having the subjects of processor. The jobs executed by a program are the jobs executed by the computer or the computer system on which the program is running.

The processor 13 works in accordance with a program to work as an operation part (means) to implement a predetermined function. For example, the processor 13 works in accordance with the storage system management program 121 to function as a storage manager and works in accordance with the connection apparatus management program 122 to functions as a connection apparatus manager. The same apply to the other programs.

Moreover, the processor 13 also works as operation parts to implement the respective jobs executed by the programs. The management computer 1 including the processor 13 and the programs is an apparatus including these operation parts. The explanations on the relationship between the programs and the processor and the relationship between the programs and the processor, and the apparatus including them apply to the other apparatuses and systems, namely, each host computer 3, the connection apparatuses 4 to 6, and each storage system 2.

The non-volatile storage apparatus 12 further stores a storage system management table 100, a storage system port management table 110, a storage system pool management table 120, a storage system usage management table 130, a virtual storage system volume management table 140, a connection apparatus management table 150, a host computer management table 160, a connectivity-from-host management table 170, a connectivity-between-storages management table 180, and a default virtual value management table 190. Details on these tables will be described later.

In this embodiment, the information used by the management computer 1 does not depend on the data structure but may be expressed in any data structure. For example, a data structure appropriately selected from table, list, database, and queue can store the information. Information is stored in a pertinent data storage area in a data storage apparatus. The same applies to the other apparatuses (including the storage systems).

Figure 8:
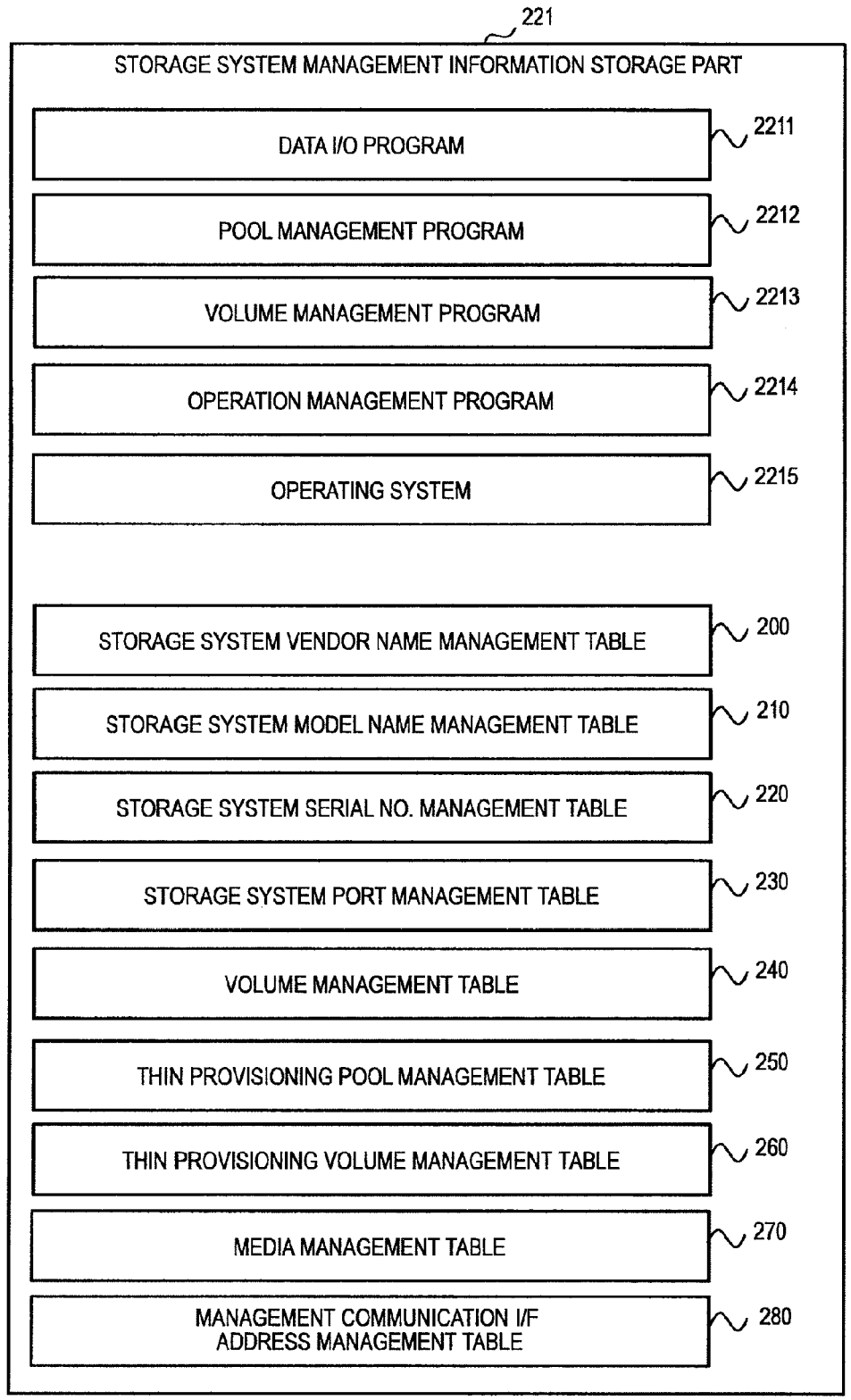
FIG. 8 is a drawing exemplifying information stored in a management information storage part in a non-volatile storage apparatus in a storage system in the embodiment.

FIG. 8 illustrates information stored in the storage system management information storage part 221 in a storage system 2. A data I/O program 2211 communicates with host computers 3 in the computer system via the connection apparatus 4 connected from the data I/O communication I/F 25, sends and receives data for the volume 2221 and the thin provisioning volume 224 and writes to them.

A pool management program 2212 manages pages 2231 in a thin provisioning pool 223, volumes 2221 as pool volumes, and allocation of the pages 2231 to thin provisioning volumes 224. A volume management program 2213 manages the volumes 2221 and the thin provisioning volumes 224. An operation management program 2214 manages operations in the storage system 2 in cooperation with various programs. An operating system 2215 is a platform for executing the various programs and for managing various tables.

The storage system management information storing part 221 further stores a storage system vendor name management table 200, a storage system model name management table 210, a storage system serial number management table 220, a storage system port management table 230, a volume management table 240, a thin provisioning pool management table 250, a thin provisioning volume management table 260, a media management table 270, and a management communication I/F address management table 280. Details on these tables will be described later.

Figure 9:
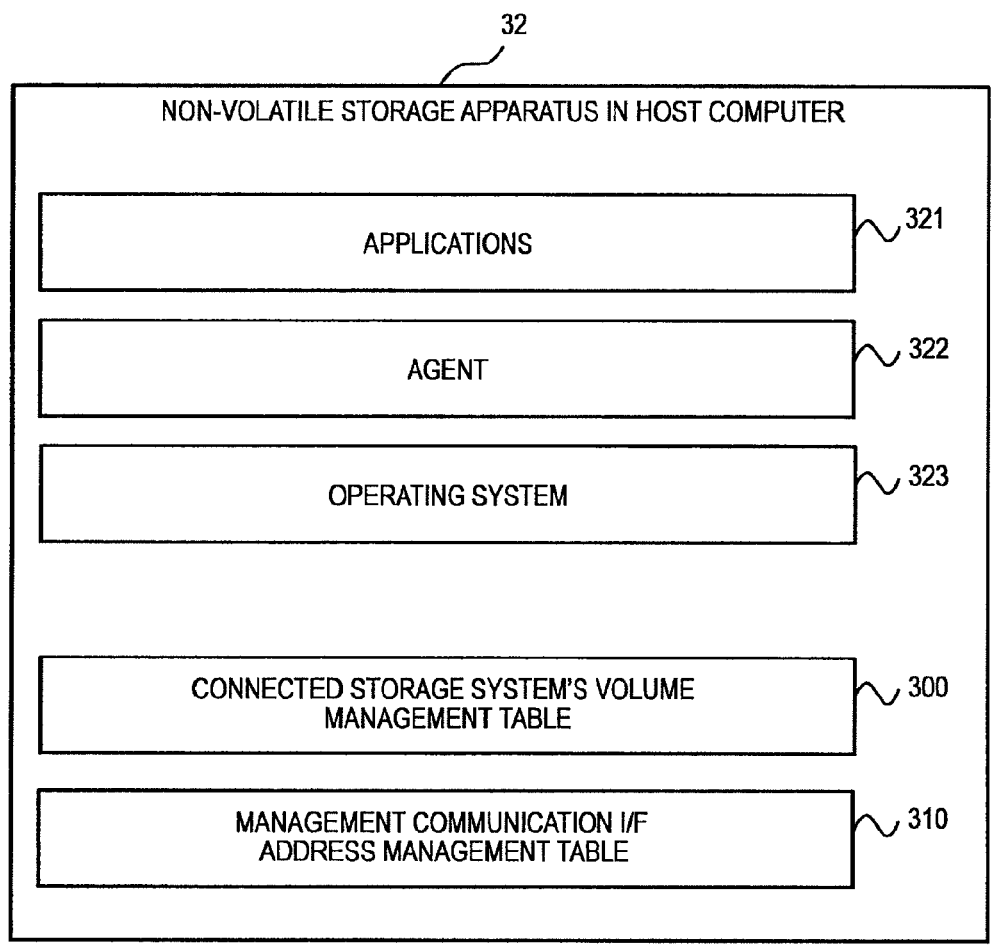
FIG. 9 is a drawing exemplifying information stored in a non-volatile storage apparatus in a host computer in the embodiment.

FIG. 9 illustrates information stored in the non-volatile storage apparatus 32 in a host computer 3. Applications 321 are programs required for the host computer 3 to provide the functions or services. An agent 322 checks the status of the host computer 3 and specifies configuration information thereon through communication with the host computer management program 123 in the management computer 1. An operating system 323 is a platform for executing various programs in the applications 321 and for managing various tables. The non-volatile storage apparatus 32 further stores a connected storage system's volume management table 300 and a management communication I/F address management table 310. Details on these tables will be described later.

Figure 10:
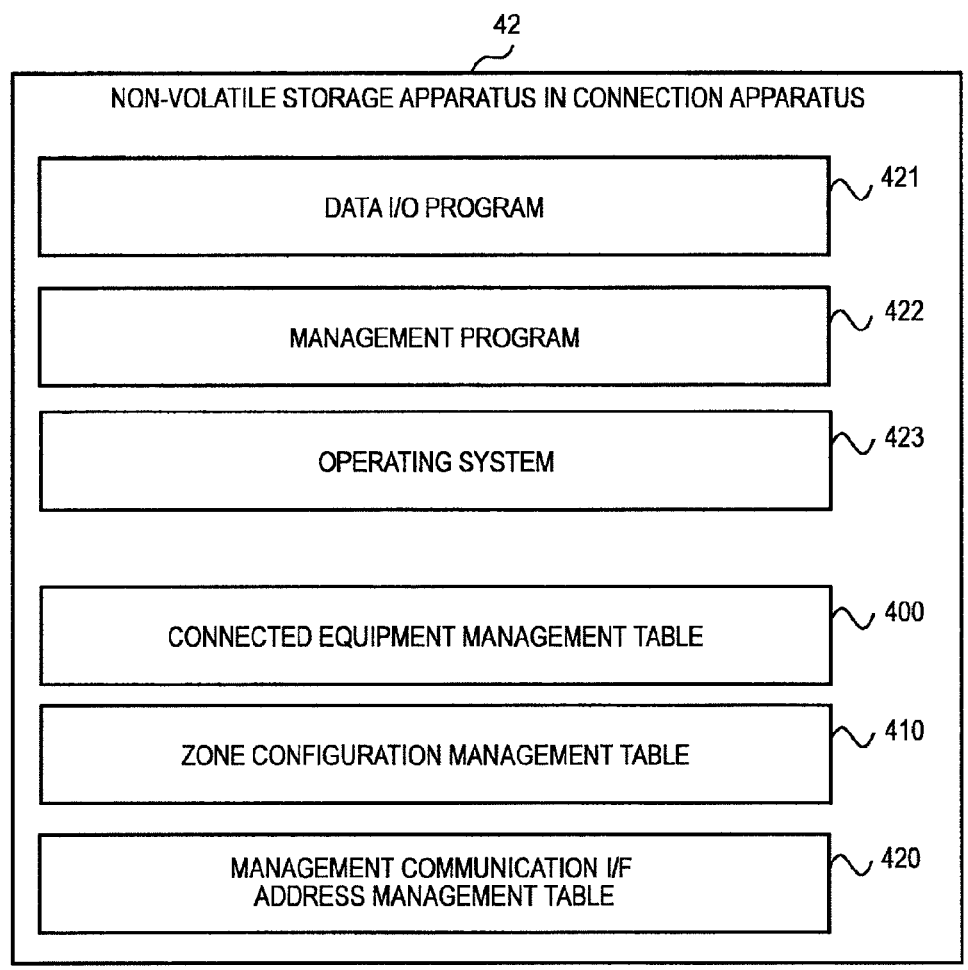
FIG. 10 is a drawing exemplifying information stored in a non-volatile storage apparatus in a connection apparatus in the embodiment.

FIG. 10 illustrates information stored in the non-volatile storage apparatus 42 in the connection apparatus 4. A data I/O program 421 receives I/O requests from computers and systems in the computer system connected to the data I/O communication IF 45 and communicates with them with reference to the tables in the non-volatile storage apparatus 42.

A management program 422 provides an interface for setting the values in the tables in the non-volatile storage apparatus 42. An operating system 423 is a platform for executing various programs and for managing various tables. The non-volatile storage apparatus 42 further stores a connected equipment management table 400, a zone configuration management table 410, and a management communication I/F address management table 420. Details on these tables will be described later.

FIG. 11 is a drawing illustrating a configuration example of a storage system management table 100 in the management computer 1 in this embodiment. The storage system management table 100 has columns of storage system IDs 1001, where a storage system ID is an ID uniquely assigned to a storage system 2 to manage it in the computer system, storage system vendor names 1002, storage system model names 1003 and storage system serial numbers 1004. The storage system vendor name, storage system model name and storage system serial number are specified at shipment of the storage system.

These values are obtained by the management computer 1 from the storage systems 2 via the connection apparatus 6 or directly inputted by the administrator. In this embodiment, IDs, names, and numbers are used as information for identifying targets, but these nominal designations can be replaced with one another.

The storage system management table 100 further has columns of default virtual vendor names 1005, default virtual model names 1006 and default virtual serial numbers 1007 which are used to respond to a request for information on connection ports or volumes issued by a host computer 3 in a SCSI Inquiry. These columns store the values copied from the default virtual value management table 190 specified by the administrator and the administrator can change the values. The administrator may specify these values individually.

The storage system management table 100 further has a column of management communication I/F addresses 1008 for managing the storage systems 2. The values in this column are inputted by the administrator.

An entry in the storage system management table 100 is added when an additional storage system 2 is installed in the computer system and the administrator issues an instruction to add a storage system. An entry in the storage system management table 100 is deleted when the administrator issues an instruction to delete a storage system 2 to remove a storage system 2 and a series of processes are finished.

FIG. 12 is a drawing illustrating a configuration example of a storage system port management table 110 in the management computer 1 in this embodiment. This table 110 manages the statuses of the data I/O communication I/Fs 25 in association with the storage system IDs 1001 in the storage system management table 100.

Usually, a plurality of data I/O communication I/Fs 25 are installed in a storage system and each data I/O communication I/F 25 is assigned a unique number in the storage system (a data I/O communication I/F number 1102). These numbers are used in accessing a storage system utilizing a plurality of paths in accordance with an alternate path program (multipath program).

Use 1103 of a data I/O communication I/F 25 is either for an access from a host or for an access between storage systems (for migration), for example. In an access between storage systems, if each port is either for targets only or for initiators only, the storage system management table 100 manages the modes of the ports. In the column of the use 1103, the administrator (user) inputs values designed at the construction of the system.

A data I/O communication IF number 1102 is a unique number in a storage system, but in the case where a plurality of storage systems 2 are managed as a single storage system, duplicate data I/O communication I/F numbers 1102 may be created.

For this reason, in the computer system in this embodiment, the management computer 1 assigns a unique virtual number (virtual data I/O communication I/F number 1104) to a data I/O communication IF 25 in a storage system 2. The management computer 1 notifies the storage system 2 of this number via the connection apparatus 6.

The storage system 2 stores the number in virtual data I/O communication I/F number 2302 in its storage system port management table 230 and uses the number in subsequent I/Os of the storage system 2 with the host computers 3 and other processes. To the data I/O communication I/F 25, a port ID is assigned to be used to locate the source or the destination of communication through the connection apparatus 4 or 5.

The port ID may be assigned at shipment of hardware or changed with a tool afterwards. Furthermore, a data I/O communication I/F can be assigned a plurality of virtual port IDs and the storage system port management table 230 manages the assigned values in the fields for port ID 1105 and virtual port ID 1106.

Entries in the storage system port management table 110 are added or deleted in synchronization with the entries in the storage system management table 100. In the following descriptions, the term of port ID means either port ID 1105 (also referred to as real port ID in contrast to virtual port ID) or virtual port ID 1106, if no specific designation. In managing ports, the real port IDs and the virtual port IDs can be treated on the same plane.

FIG. 13 is a drawing illustrating a configuration example of a storage system pool management table 120 in the management computer 1 in this embodiment. This table 120 manages thin provisioning pools 223 in the storage systems in the computer system and has columns of pool names 1201, where a pool name is a common name shred by one or more storage systems; total capacities 1202, where the total capacity provided by the one or more storage systems is stored; and amount of usage 1203 of the pool.

Furthermore, the storage system pool management table 120 stores the values obtained by copying the storage system IDs 1001 of the individual storage systems that constitute the pool from the storage system management table 100 in the fields of 1204, and has fields of capacity 1205A, amount of usage 1205B, and IOPS (Input Output Per Second) 1206A for each of the storage systems.

Still further, the storage system pool management table 120 contains capacity thresholds 1205C and performance thresholds 1206B, which are the threshold values to perform adjustment if the amounts of usage and the IOPS, respectively, exceed them in the individual storage systems 2. In addition, the table contains constituent volume IDs 1207A for the volumes that constitute the pool, and capacities 1207B and amounts of usage 1207C for the individual constituent volumes.

An entry in the storage system pool management table 120 is added when the administrator issues an instruction to create a thin provisioning pool 223 and deleted when the administrator issues an instruction to delete a thin provisioning pool 223. An entry of the constituent volume ID 1207A associated with a storage system ID 1204 are added or deleted responsive to addition or deletion of the volume.

The values of the capacity threshold 1205C and the performance threshold 1206B are specified by the administrator. To obtain the values of the amount of usage 1205B, the IOPS 1206A, and the amount of usage 1207C, the management computer 1 periodically makes an inquiry to the storage system 2 via the connection apparatus 6 and stores obtained values from the storage system 2 to the fields.

FIG. 14 is a drawing illustrating a configuration example of a storage system usage management table 130 in the management computer 1 in this embodiment. The storage system usage management table 130 manages the usage of each storage system 2 and has a column of storage system IDs 1301 corresponding to the storage system IDs 1001 in the storage system management table 100.

The storage system usage management table 130 further has columns for storing values of the capacity 1302, the capacity threshold 1303, and the amount of usage 1304 of the storage system identified by each storage system ID 1301. Moreover, it includes values of the media type 1306, the RAID structure 1307, the capacity 1308, and the amount of usage 1309 for each of the media IDs 1305 in each storage system. To obtain the other values associated with the value of each storage system ID 1301, the management computer 1 periodically makes an inquiry to each storage system 2 via the connection apparatus 6 and stores obtained values to the fields.

FIG. 15 is a drawing illustrating a configuration example of a virtual storage system volume management table 140 in the management computer 1 in this embodiment to manage a plurality of volumes existing in the computer system with unique numbers assigned. A virtual volume number 1401 is assigned to each virtual volume and the information on the other items is managed in association with the virtual volume number.

A capacity 1402 indicates the capacity of a virtual volume; an amount of usage 1403 indicates the amount of usage of a virtual volume; and a volume type 1404 indicates which type of volume a virtual volume is, a normal volume, a thin provisioning volume, or pool volume.

The virtual storage system volume management table 140 further includes columns of IDs 1405 of the storage systems where the volumes actually exist, volume IDs 1406 which are identification information for uniquely identifying volumes in the storage systems (only), media IDs 1407 for identifying RAID groups in the storage systems 2, virtual port numbers 1408A, and alternate virtual port numbers 1408B.

A value of the virtual volume ID 1401 is assigned at creation of a volume and is a common number in this computer system (all of the storage systems 2) and identification information for uniquely identifying the volume in the computer system. Values of the capacity 1402 and the volume type 1404 are specified by the administrator at creation of the volume. Depending on the situation, a value of the media ID 1407 is specified and in accordance with the specification, an instruction to create a volume is sent to the storage system 2.

Values of the virtual port number 1408A and the alternate virtual port number 1408B are set for the administrator to specify from which data I/O communication I/F 25 in a storage system 2 in the computer system the volume is to be accessed. The values of the virtual data I/O communication IF numbers are assigned to the values of the virtual port number 1408A and the alternate virtual port number 1408B.

FIG. 16 is a drawing illustrating a configuration example of a connection apparatus management table 150 in the management computer 1 in this embodiment. The table 150 has columns of connection apparatus IDs 1501, apparatus names 1502 of the connection apparatuses, management communication I/F addresses 1503 for the connection apparatuses, and use 1504 of the connection apparatuses. A connection apparatus for hosts connects host computers to storage systems and a connection apparatus for migration connects storage systems. Values in each column are inputted by the administrator. The management computer 1 refers to the values for management communication with the connection apparatus 4, 5, or 6.

FIG. 17 is a drawing illustrating a configuration example of a host computer management table 160 in the management computer 1 in this embodiment. This table 160 has columns of host IDs 1601; host IPs 1602, which are the addresses of the management communication I/Fs in the host computers 3; and host-side port IDs 1603, which are the port IDs of the addresses of the data I/O communication I/Fs.

Values in these columns are inputted by the administrator and referred to when management communication to a host computer 3 is necessary. The management computer 1 may ask the agent 322 or the operating system 323 in a host computer 3 for the host-side port ID 1603 after the value of the host IP 1602 is inputted.

FIG. 18 is a drawing illustrating a configuration example of a connectivity-from-host management table 170 in the management computer 1 in this embodiment to manage the storage systems 2 connectable from the data I/O communication I/Fs 35 in the host computers 3. This table 170 has columns of connection apparatus connectivity 1702, connectable port IDs 1703, and connectivity 1704.

A connection apparatus connectivity 1702 stores a check status on the connectivity between the port ID 1701 of the data I/O communication IF 35 in a host computer and the connection apparatus 4. A connectivity 1704 stores a check status on the connectivity between the port ID 1701 of the data I/O communication I/F 35 in a host computer and a connectable port ID 1703.

The management computer 1 communicates with the connection apparatus 4 via the connection apparatus 6, inquires about the connectivity of a target host computer 3, and stores obtained information to the connection apparatus connectivity 1702.

Connectable port IDs 1703 store a copied list of the port IDs 1105 or the virtual port IDs 1106 of the entries containing the value "for host" in the use 1103 in the storage system management table 100. The management computer 1 notifies each storage system 2 of the port ID 1701 of a host computer 3, instructs the connection apparatus 4 to query whether the storage system 2 can connect to the port ID, and obtains the status.

The check method may inform the agent 322 in each host computer 3 of the connectable port IDs 1703, and instructs the connection apparatus 4 to query whether connections are available or not to obtain the statuses, instead of obtaining the statuses via the storage systems 2.

A connection apparatus connectivity 1702 is a field for checking whether the host computer 3 of an entry is connected to the connection apparatus 4 which is connectable to the storage systems 2, and the management computer 1 outputs an error if the host computer 3 is not connected. The connectivity 1704 is used to limit an access port range for provisioning or migration with an assumption that connection through some port might be disabled.

FIG. 19 is a drawing illustrating a configuration example of a connectivity-between-storages management table 180 in the management computer 1 in this embodiment to manage connection statuses of the data I/O communication I/Fs between storage systems 2. The table 180 of FIG. 19 shows an example of a connectivity-between-storages management table from a certain port. The table stores information on the connectivity between the certain port and a port of each entry. For example, the table 180 is a table for a port of in a storage system having the storage system ID of 3.

The connectivity-between-storages management table 180 has columns of storage system IDs 1801, port IDs 1802 of the data I/O communication I/Fs 25 in the storage systems 2 corresponding to the IDs, and connectivity 1803.

To check the connectivity 1803 between (ports of) storage systems, the management computer 1 notifies storage systems 2 of their port IDs 1105 or virtual port IDs 1106 whose entries contain the value of "for migration" in the use 1103 in the storage system management table 100 and instructs each of the storage systems 2 to query the connection apparatus 5 about whether each of the ports (port IDs 1105 or virtual port IDs 1106) can connect from some port in a different storage system. The management computer 1 obtains information on the status (connectivity) from each storage system 2.

FIG. 20 is a drawing illustrating a configuration example of a default value management table 190 in the management computer 1 in this embodiment to manage default values for a storage system 2 in the computer system to notify a host computer 3. All of the values for default virtual vendor names 1901, default virtual model names 1902, and default virtual serial numbers 1903 are inputted by the administrator at the initial setting.

FIG. 21 is a drawing illustrating a configuration example of a storage system vendor name management table 200 in a storage system 2 in this embodiment. The storage system vendor name management table 200 stores a value to be copied to the virtual vendor name 2406A in the volume management table 240, which is a value to be returned to a host computer 3. When installing a storage system 2 into the computer system, the operation management program 2214 stores a default virtual vendor name 1901 transmitted from the management computer 1 via the connection apparatus 6 to this table.

FIG. 22 is a drawing illustrating a configuration example of a storage system model name management table 210 in a storage system 2 in this embodiment. The storage system model name management table 210 stores a value to be copied to the virtual model name 2406B in the volume management table 240, which is a value to be returned to a host computer 3. When installing a storage system 2 into the computer system, the operation management program 2214 stores a default virtual model name 1902 transmitted from the management computer 1 via the connection apparatus 6 to this table.

FIG. 23 is a drawing illustrating a configuration example of a storage system serial number management table 220 in a storage system 2 in this embodiment. The storage system serial number management table 220 stores a value to be copied to the virtual serial number 2406C in the volume management table 240, which is a value to be returned to a host computer 3. When introducing a storage system 2 into the computer system, the operation management program 2214 stores a default virtual serial number 1903 transmitted from the management computer 1 via the connection apparatus 6 to this table.

FIG. 24 is a drawing illustrating a configuration example of a storage system port management table 230 in a storage system 2 in this embodiment. The table 230 is for managing data I/O communication I/Fs 25 in a storage system 2 and has columns of data I/O communication I/F numbers 2301, virtual data I/O communication I/F numbers 2302, use 2303, port IDs 2304, and virtual port IDs 2305.

A data I/O communication I/F number 2301 holds a hardware-specific value, and in association with it, a unique virtual data I/O communication I/F number 2302 in the computer system is assigned. The management computer 1 creates a value unique to the computer system based on the virtual data I/O communication I/F number 1104 in the storage system port management table 110 and transmits it to the storage system 2 via the connection apparatus 6 and the operation management program 2214 stores the value to the table.

Use 2303 stores a value indicating either for hosts or for migration, which is specified by the administrator. A port ID 2304 stores a hardware-specific value provided to the data I/O communication I/F. A virtual port ID 2305 is an ID virtually assigned to the port ID and it is different from the hardware-specific port ID.

FIG. 25 is a drawing illustrating a configuration example of a volume management table 240 in a storage system 2 in this embodiment. The table 240 is for managing the configuration and conditions of volumes in the storage system 2. Each entry is uniquely identified by the value of the volume ID 2401.

A capacity 2402 indicates the capacity of the volume. A type 2403 stores information indicating that the volume is a normal volume, a thin provisioning volume, or a thin provisioning pool volume. A media ID 2404 stores an ID of the media for which the volume is created. A virtual volume number 2405 stores a number uniquely determined in the system and assigned by the management computer 1 at the creation of the volume.

Values of a virtual vendor name 2406A, a virtual model name 2406B, a virtual serial number 2406C, a virtual port number 2407A, and an alternate virtual port number 2407B are used to respond to queries on a volume or a port from a host computer 3. A port number 2408A and an alternate port number 2408B store the numbers of a port and an alternate port used for actual I/Os. Cache allowability 2409 stores a value indicating the allowability of cache to an I/O request from a host computer.

An entry of the table is created in response to a request for creating a volume from the management computer 1. To the volume ID 2401, the storage system 2 assigns a unique value in creating a new volume. The capacity 2402 and the type 2403 store values specified by the administrator. If the media ID 2404 is specified, the storage system 2 creates a volume for the specified media. If it is not specified, the storage system 2 creates a volume for arbitrary media and stores the ID of the media.

The column of virtual volume numbers 2405 store values assigned by the management computer 1 to uniquely identify virtual volumes in the computer system. The virtual volume numbers 2405 informed of by the management computer 1 is identification information shared in the computer system.

The columns of virtual vendor names 2406A, virtual model names 2406B, and virtual serial numbers 2406C store values of the default virtual vendor name 2002 in the storage system vendor name management table 200, the default virtual model name 2102 in the storage system model name management table 210, and the default virtual serial number 2202 in the storage system serial number management table 220, respectively. If the administrator wants to take over the values for different storage systems, those values may be stored.

A virtual port number 2407A and an alternate virtual port number 2407B are specified by the administrator. The storage system 2 refers to the storage system port management table 230 and if a virtual data I/O communication IF number 2302 corresponding to the virtual port number 2407A or the alternate virtual port number 2407B exists, it stores the relevant data I/O communication I/F number 2301 to the port number 2408A or the alternate port number 2408B.

If the corresponding virtual data I/O communication I/F number 2302 does not exists, the storage system 2 stores the value of the data I/O communication I/F 2301 in an entry containing the value "for migration" in the use 2303 to the port number 2408A or the alternate port number 2408B. If both of the use 2303 of the port number 2408A and the alternate port number 2408B of the entry indicate "for host", the storage system 2 stores values indicating "allowable" in the fields for the cache allowability 2409 of the entries. It stores values indicating "unallowable" otherwise.

FIG. 26 is a drawing illustrating a configuration example of a thin provisioning pool management table 250 in a storage system 2 in this embodiment. The table 250 is for managing the configurations of thin provisioning pools 223 and has columns of pool IDs 2501, total capacities 2502, amounts of usage 2503, constituent volume IDs 2504, capacities 2505, amounts of usage 2506, page numbers 2507, and statuses 2508.

A pool ID 2501 is a value uniquely determined among the storage systems 2 and specified by the administrator at the creation of a pool by the management computer 1. A total capacity 2502 is a total amount of the capacities of the constituent volumes 2505 associated with the pool ID. An amount of usage 2503 is a total amount of the amounts of usage of the constituent volumes 2506.

A constituent volume ID 2504 stores a volume ID 2401 of the volume selected for the pool from the volume management table 240. A capacity 2505 stores a value copied from the capacity 2402 of the entry corresponding to the selected volume ID 2401. An amount of usage 2506 stores zero as the initial value.

A volume is divided into pages 2231 to allocate them to thin provisioning volumes 224; accordingly, numbers individually assigned to the plurality of pages are stored in page numbers 2507. A field for status 2508 stores a value indicating the status of allocation of the page. If another page is needed for a thin provisioning volume because of a write request from a host computer 3, a page indicating a status 2508 "unallocated" is allocated and the status 2508 of the page is changed into "allocated". Moreover, the size of the allocated page is added to the amount of usage 2506.

FIG. 27 is a drawing illustrating a configuration example of a thin provisioning volume management table 260 in a storage system 2 in this embodiment. The thin provisioning volume management table 260 indicates pages 2231 to constitute a thin provisioning volume 224 and has columns of volume IDs 2601, maximum capacities 2602, amounts of usage 2603, pool IDs 2604, constituent volume IDs 2605, and page numbers 2606.

In accordance with an instruction of the management computer 1 to create a volume, an entry is added to the volume management table 240. If the type 2403 therein is "thin provisioning", an entry is added to the thin provisioning volume management table 260. A volume ID 2601 stores a value copied from the volume ID 2401 in the volume management table 240.

A maximum capacity 2602 stores a value copied from the capacity 2402 in the volume management table 240. The initial value of an amount of usage 2603 is zero. Every time a new page allocated is needed because of a write from a host computer 3, a page is allocated whose status 2508 shows "unallocated" among the pages in association with the pool ID 2604. The values of the constituent volume ID 2504 and the page number 2507 are copied and stored to the constituent volume ID 2605 and the page number 2606.

FIG. 28 is a drawing illustrating a configuration example of a media management table 270 in a storage system 2 in this embodiment. The media management table 270 manages the conditions of media 222 and has columns of media IDs 2701, media types 2702, RAID structures 2703, capacities 2704, and amounts of usage 2705.

To a media ID 2701, a unique value is assigned when a medium 222 is added to a storage system 2. To a media type 2702, a value such as SSD, SAS, or SATA is inputted by the administrator in accordance with the added media. A RAID structure 2703 stores a value the administrator inputs in accordance with the constructed RAID structure. A capacity 2704 stores the size of the installed media inputted by the administrator. The storage system 2 may scan every media and summarize the capacities. An amount of usage 2705 contains the initial value of zero and stores the amount of usage obtained by adding the amount allocated at the creation of the volume.

FIG. 29 is a drawing illustrating a configuration example of a management communication I/F address table 280 in a storage system 2 in this embodiment. The table 260 stores the addresses 2801 of management communication I/Fs 26. At the installation of a storage system 2 to the computer system, the administrator specifies the value.

FIG. 30 is a drawing illustrating a configuration example of a connected storage system's volume management table 300 in a host computer 3 in this embodiment. This table 300 stores information on volumes which are allocated to a host computer 3 and readable or writable. This table has columns of IDs 3001, volume IDs 3002, system vendor names 3003, system model names 3004, system serial numbers 3005, port IDs 3006, and data I/O communication I/F numbers 3007.

An ID 3001 is an identifier uniquely assigned to each volume in a host computer 3. A port ID 3006 is a port ID (virtual port ID or real port ID) in the storage system 2 to access; the value may be input by the administrator or may store the value of which the management computer 1 notifies the agent 322. The operating system 323 in the host computer 3 refers to the port ID 3006 to access the storage system 2.

The operating system 323 obtains a virtual volume number uniquely identifying the volume in the computer system from the management computer 1 and stores it in the field for the volume ID 3002. The operating system 323 sends an information acquisition request to obtain information on the volume identified with the volume ID 3002 to (the port indicated by the value of the port ID 3006 of) the storage system 2 via the connection apparatus 4.

The operating system 323 stores information obtained in response to this request from the storage system 2 to the fields for the system vendor name 3003, the system model name 3004, the system serial number 3005, and the data I/O communication I/F number 3007. A data I/O communication I/F number 3007 stores the value of the virtual data I/O communication I/F number 1104 in the storage system 2 (the unique data I/O communication I/F number in the computer system).

In this configuration, the system vendor name 3003, the system model name 3004, the system serial number 3005 store default values (same values) 2002, 2102, and 2202, respectively, which are common to all of the storage systems 2. These values are storage identification information common to (same to) all of the storage systems 2.

The operating system 323 and an alternate path program in the host computer 3 locate a volume using identification information on volumes and identification information on the storage system to which the volume belongs. If the identification information is changed in operation of the system, the host computer 3 cannot recognize that the volume is the same one, so that it cannot access (read or write data) the volume.

For example, in this configuration, if any one of the system vendor name 3003, the system model name 3004, and the system serial number 3005 is changed, the host computer 3 identifies the volume as the one belonging to a different storage system and as a different volume (cannot identify it as the same volume).

This system assigns virtual volume numbers, which are unique identification information common to a plurality of the storage systems 2, to the volumes provided by the plurality of storage systems 2. Moreover, each storage system 2 holds default storage identification information (foregoing default values) same for the plurality of storage systems in addition to identification information in the individual storage systems 2. The host computer 3 is provided with the default storage identification information for the volume information.

If the storage identification information and the volume identification information are the same, the host computer 3 can normally access volumes in different storage systems. In other words, the host computer 3 regards a plurality of storage systems 2 as a single storage system and can access the volumes in the storage systems 2 without any trouble.

For example, a volume in the storage system 2A is migrated to the storage system 2B, the host computer 3 can access the migration destination volume using the same volume identification information and the same storage identification information. In addition, the host computer 3 can read or write to a volume in the storage system 2A via either one of the port in the storage system 2A and the port in the storage system 2B (the details of this method using an external connection technique will be described later).

In this configuration example, the common storage system identification information includes the system vendor name 3003, the system model name 3004, and the system serial number 3005, but may include only a part of these or additional different information. The information required for a host computer 3 to identify volumes are determined depending on the design and the common storage system identification information is determined in accordance with the design; typically, the information includes the system type name and the system serial number.

FIG. 31 is a drawing illustrating a configuration example of a management communication I/F address management table 310 in a host computer 3 in this embodiment. The table 310 stores the address 3101 of a management communication I/F 36. At the installation of a host computer 3 to the computer system, the administrator specifies the value.

FIG. 32 is a drawing illustrating a configuration example of a connected equipment management table 400 in each of the connection apparatuses 4, 5, and 6 in this embodiment. The table 400 is a table for managing connection statuses to the data I/O communication I/Fs 45 of each of the connection apparatuses 4, 5, and 6 and has columns of connection numbers 4001, port IDs 4002 and lamp statuses 4003.

A connection number 4001 is a number assigned to the hardware of a data I/O communication I/F 45. Upon physical connection from some equipment, each of the connection apparatuses 4, 5, and 6 obtains the port ID assigned to the connected equipment and stores it in the port ID 4002. A value in the lamp status 4003 is set at ON if the equipment is connected and its port ID is obtained; and is set at OFF otherwise. The management program 422 in the connection apparatus monitors the lamp statuses 4003; if some lamp status is ON, it turns on the link lamp 48 connected to the data I/O communication I/F 45, and if it is OFF, it turns off the link lamp 48.

FIG. 33 is a drawing illustrating a configuration example of a zone configuration management table 410 in each of the connection apparatuses 4 and 5 in this embodiment. The table 410 is a table for managing zone configuration which prohibits communication between specific port IDs from being referred to from a different port ID and has columns of zone IDs 4101 and port IDs 4102.

In response to a zone creation instruction from the management computer 1, a management program 422 creates an entry for the zone configuration management table 410 and stores a unique zone ID 4102 in the connection apparatus and port IDs 4102 to join the zone to the zone configuration management table 410. The data I/O program 421 refers to this table and transfers a request from some port ID only to the port IDs belonging to the zone.

FIG. 34 is a drawing illustrating a configuration example of a management communication I/F address management table 420 in each of the connection apparatuses 4, 5, and 6 in this embodiment. The table 420 stores the address 4201 of a management communication I/F 46. At the installation of a connection apparatus to the computer system, the administrator sets the value in the table 420.

Figure 35:
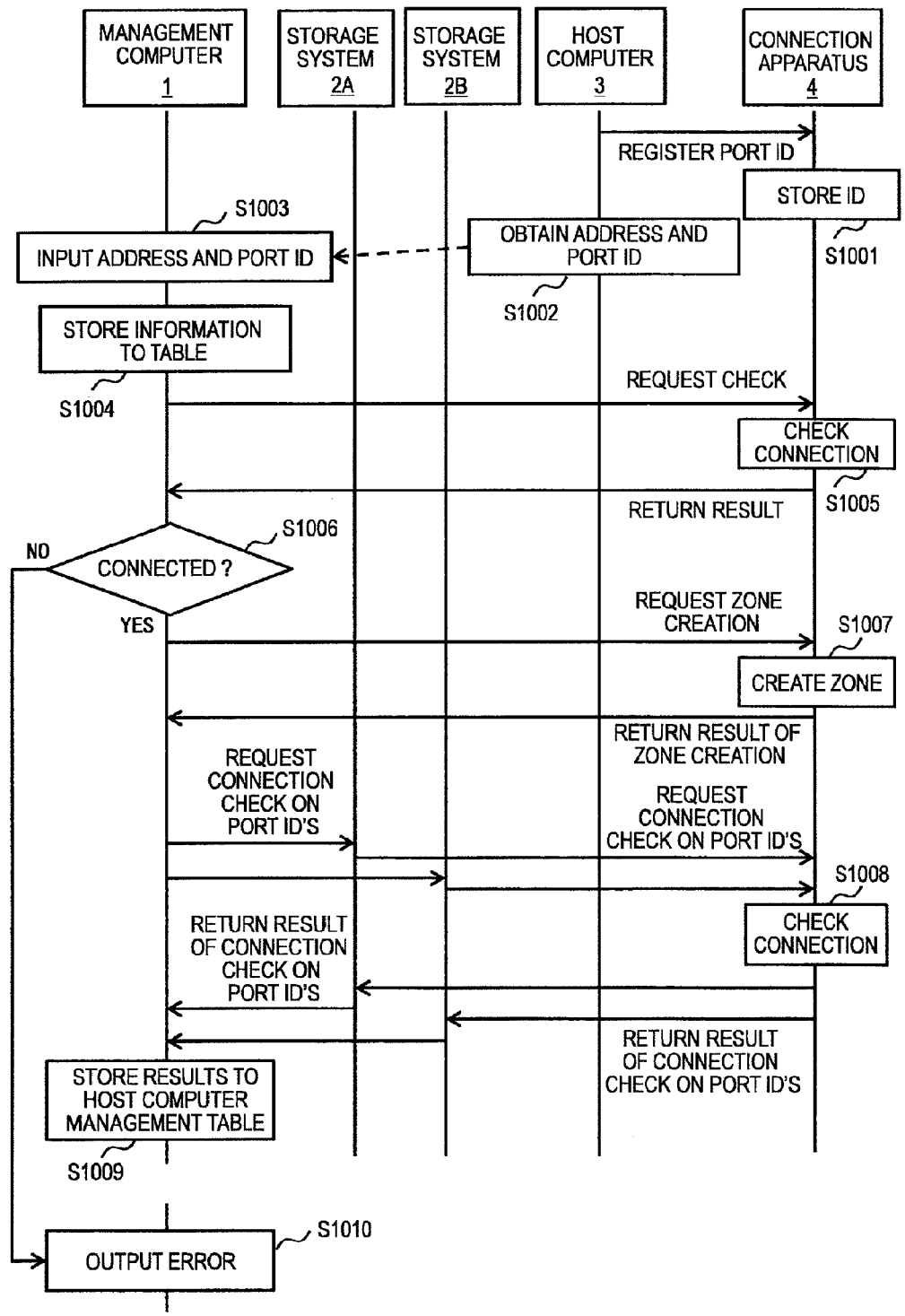
FIG. 35 is a drawing illustrating a flow of adding a host computer in a computer system in the embodiment.

FIG. 35 is a diagram illustrating a process flow of adding a host computer 3 in the computer system in this embodiment. When a host computer 3 is wire connected to the connection apparatus 4, the data I/O program 421 in the connection apparatus 4 detects the connection, obtains the port ID of the connection source, specifically, the port ID 3102 of the host computer, from the host computer 3, stores it in the port ID 4002 in the connection apparatus management table 400, and sets the value ON to the lamp status 4003 (S1001).

Next, the administrator identifies the management communication I/F address 3101 and the port ID 3102 of the host computer 3 using the input apparatus 39 and the image output apparatus 38 in the host computer 3 (S1002). The administrator inputs the obtained information using the input apparatus 19 in the management computer 1 (S1003).

The host computer management program 123 in the management computer 1 stores inputted information to the host IP 1602 in the host computer management table 160 and the port ID 1701 in the connectivity-from-host management table 170. The host computer management program 123 lists the port IDs 1105 and the virtual port IDs 1106 in the storage system port management table 110 and stores them to the connectable port ID 1703 in the connectivity-from-host management table 170 (S1004).

Then, for checking connection of the host computer to the connection apparatus 4, the host computer management program 123 transmits the inputted port ID of the host computer 3 together with a connection check request to the management communication I/F address 1503 of an entry (connection apparatus) containing the value "for host" in the use 1504 in the connection apparatus management table 150.

The management program 422 in the connection apparatus 4 searches the port IDs 4002 in the connection apparatus management table 400 for the received port ID and responds about the existence. If the received port ID exists in the connection apparatus management table 400, it means that the port (host computer 3) is connected to the connection apparatus 4. This connection check may be performed by obtaining a list of connection statuses of the physical ports provided to the management communication I/F in the connection apparatus, for example an FC switch, and searching the obtained list for the port ID (S1005).

The host computer management program 123 in the management computer 1 checks the received response (S1006). If the port of the host computer 3 is not connected to the connection apparatus 4, the host computer management program 123 stores a value indicating a connection error in the connection apparatus connectivity 1702 in the connectivity-from-host management table 170 and outputs an error to the image output apparatus 18 to terminate the process (S1010).

If the port is connected to the connection apparatus 4, the host computer management program 123 changes the value of the connection apparatus connectivity 1702 into "checked". The connection apparatus management program 122 transmits a request to create a zone among the connectable ports 1703 of the same entry and the port ID 1701 of the host to the connection apparatus 4. The management program 422 in the connection apparatus 4 stores the received port IDs to the port ID 4102 in the zone management table 410 and responds to the management computer 1 to report the creation of the zone (S1007). The zone creation (S1007) may be omitted.

For checking connection between the storage systems 2 and the host computer 3, the storage system management program 121 in the management computer 1 refers to the management communication I/F addresses 1008 in the storage system management table 100 and transmits the port ID 1701 of the host computer 3 to the addresses of the storage systems 2 in all of the entries. FIG. 35 illustrates an example of issuing requests to two storage systems 2A and 2B.

The operation management program 2214 in each storage system 2 requests the connection apparatus 4 to check whether the own ports can connect to the received port ID of the host computer 3. Specifically, the operation management program 2214 transmits a list of the port ID of the added host computer and the own port ID and virtual port IDs to the connection apparatus 4 with a connection check request.

The connection apparatus 4 refers to the connected equipment management table 400 and checks for the received port ID of the host computer 3, and the port ID and virtual port IDs of the storage system (S1008). The connection apparatus 4 further refers to the zone configuration management table 410 for checking the permission of connection.

If the ID of a port (physical port or virtual port) of the storage system 2 exists in the connected equipment management table 400 with the port ID of the host computer 3 and they belong to the same zone in the zone configuration management table 410, the port of the storage system 2 is connectable to the host computer 3. If either condition is not satisfied, they cannot connect to each other.

The connection apparatus 4 returns a response to the storage systems 2 about the permission of connection between each port (a port ID or a virtual port ID) of the storage systems 2 and the port of the added host computer 3. This connection check may be performed by a discovery function of a designated port on a fibre channel. The management computer may directly instruct the connection apparatus 4 to check connection between the host computer 3 and the storage systems 2.

The storage system management program 121 in the management computer 1 sequentially stores check results received from the storage systems 2 on the ports to the column of connectivity 1704 in the connectivity-from-host management table 170 to terminate the process of adding a host computer (S1009). The connection apparatus 4 may send the check result to the management computer 1 without the storage system 2. As explained above, the system conducts connection check in adding a host computer 3, so that a wiring mistake in installing a host computer can be prevented and workload of the administrator can be reduced. Moreover, it enables automatic selection of a storage system connected from a host computer in volume creation and volume migration, so that workload of the administrator in operation can be reduced.

Figure 36:
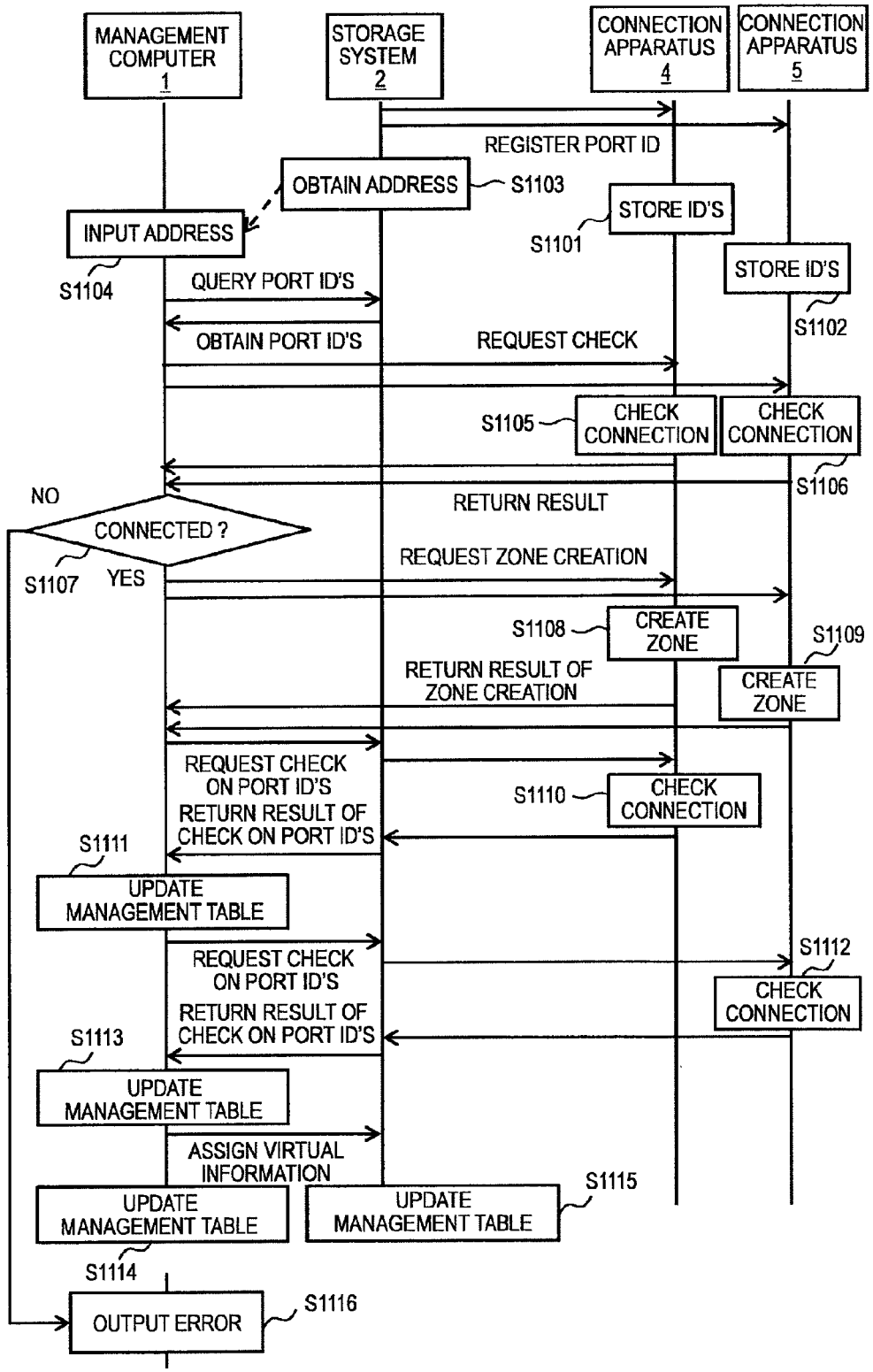
FIG. 36 is a drawing illustrating a flow of adding a storage system in a computer system in the embodiment.

FIG. 36 is a diagram illustrating a flow of a process of adding a storage system 2 in the computer system in this embodiment. When installing a storage system 2, the administrator wire connects ports for host connection to the connection apparatus 4 and ports for migration to the connection apparatus 5.

Each of the data I/O programs 421 in the connection apparatuses 4 and 5 detects connection; obtains the port IDs of the connection source, specifically, the port IDs 2304 or the virtual port IDs 2305 of the storage system, from the storage system 2; stores them to the port ID 4002 in the connected equipment management table 400; and changes the values in the lamp status 4003 from OFF to ON (S1101, S1102).

Next, the administrator identifies the management communication I/F address 2801, the vendor name 2001, the system model name 2101, and the serial number 2201 using the input apparatus 29 and the image output apparatus 28 in the storage system 2 (S1103).

The administrator inputs the obtained address, vendor name, system model name, and serial number using the input apparatus 19 of the management computer 1. Specifically, the administrator adds a new entry to the storage system management table 100 and inputs information to the management communication I/F address 1008, the storage system vendor name 1002, the storage system model name 1003, and the storage system serial number 1004 (S1104).

The operation management program 124 in the management computer 1 make a query for the port IDs to the management communication I/F address 1008 in the storage system 2. The operation management program 2214 in the storage system 2 returns the values in the relevant fields for the entries in the storage system port management table 230.

The operation management program 124 in the management computer 1 stores the received contents of the storage system port management table 230 to the storage system port management table 110. Specifically, it stores the values of the data I/O communication I/F number 2301 to the data I/O communication I/F number 1102, the values of the use 2303 to the use 1103, the values of the port ID 2304 to the port ID 1105, and the values of the virtual port ID 2305 to the virtual port ID 1106.

The operation management program 124 assigns virtual data I/O communication I/F numbers to the received entries and stores them in the fields for the virtual data I/O communication I/F number 1104. Furthermore, it sends the assigned virtual data I/O communication I/F numbers to the storage system 2. The operation management program 2214 in the storage system 2 stores the received virtual data I/O communication I/F numbers in the fields for the virtual data I/O communication I/F number 2302.

Then, the operation management program 124 lists the port IDs 1105 and the virtual port IDs 1106 of the entries containing the values of "for host" in the use 1103 in the storage system port management table 110 and registers them in the connectable port ID 1703 in the connectivity-from-host management table 170. Furthermore, it sets "unchecked" to the connectivity 1704 of each entry.

The operation management program 124 further adds entries to the connectivity-between-storages management table 180, lists the port IDs of the entries containing the values of "for migration" in the use 1103 in the storage system port management table 110 and stores them in the port ID 1802. In addition, it sets "unchecked" to the connectivity 1803 of each entry.

Next, the connection apparatus management program 122 in the management computer 1 requests the connection apparatus 4 to check connection on the entries containing the value "unchecked" in the connectivity 1704 in the connectivity-from-host management table 170, and the connection apparatus 5 to check connection on the entries containing the value "unchecked" in the connectivity 1803 in the connectivity-between-storages management table 180.

The check method by the connection apparatuses 4 and 5 (S1105, S1106) are the same as the method explained at S1005; the connection apparatuses 4 and 5 search the port IDs 4002 in the connected equipment management table 400 for the received IDs and returns the result. The connection apparatus management program 122 stores the result of check from the connection apparatus 4 to the connectivity 1704 and the result of check from the connection apparatus 5 to the connectivity 1803. This connection check is a check of connection between the added storage system 2 and the connection apparatuses 4, 5. The connection apparatus management program 122 stores "physical connection checked" (not shown in FIG. 18 and FIG. 19) to the fields of ports whose normal connection is checked in the columns of connectivity 1704, 1803.

The connection apparatus management program 122 checks the contents of the connectivity 1803 (S1107) and if it is "connection disabled" (NO at S1107), it outputs an error and terminates the process (S1116). The connection apparatus management program 122 checks the value of the connectivity 1704 (S1107) and if all of the newly added port IDs (including virtual port IDs) are "connection disabled" (NO at S1107), it outputs an error and terminates the process (S1116).

If there is no problem with the connectivity (YES at S1107), the connection apparatus management program 122 in the management computer 1 transmits the list of the port IDs 1701 and the connectable port IDs 1703 in the connectivity-from-host management table 170 to the connection apparatus 4 to configure a zone in the connection apparatus 4 and the connection apparatus 4 creates zones (S1108). The connection apparatus management program 122 transmits the list of the port IDs 1802 in the connectivity-between-storages management table 170 to the connection apparatus 5 and the connection apparatus 4 creates a zone (S1109). The methods at S1108 and S1109 are the same as the method explained at S1007. The process of creating a zone (S1108 or S1109) does not need to be performed.

The storage system management program 121 in the management computer 1 transmits the port IDs 1701 of the host computers 3 of entries containing the value "physical connection checked" in the connectivity 1704 (connectivity between a host port and a storage port) in the connectivity-from-host management table 170 to the management communication I/F address of the entries with reference to the management communication IF addresses 1008 in the storage system management table 100.

The storage system management program 121 can locate the entry (management communication IF address) in the storage system management table 100 from the entries in the connectivity-from-host management table 170 with reference to the storage system port management table 110.

The operation management program 2214 in the storage system 2 requests the connection apparatus 4 to check whether its own ports (ports identified by port IDs or virtual port IDs) can connect to the ports of the host computers 3 indicated by the received port IDs. The method of this request is the same as the method of request in the process of adding a host computer 3.

The connection apparatus 4 executes connection check responsive to the check request from the storage system 2. The method of the connection check by the connection apparatus 4 is the same as that in S1008 in the process of adding a host computer 3. The connection apparatus 4 returns a response about the permission of connection of the storage system 2 to the other ports to the storage system 2 (S1110).

The storage system 2 returns the result of check on the permission of connection received from the connection apparatus 4 to the management computer 1. The storage system management program 121 in the management computer 1 sequentially stores the received results of check on the connectivity of the ports of the storage system 2 to the connectivity 1704 in the connectivity-from-host management table 170 (S1111).

Next, the management computer 1 checks connection between storage systems. The storage system management program 121 in the management computer 1 locates the management communication I/F address of the newly added storage system 2 with reference to the column of the management communication I/F addresses 1008 in the storage system management table 100.

The storage system management program 121 transmits the values of the port IDs 1802 of the entries containing the value "physical connection checked" in the connectivity 1803 in the connectivity-between-storages management table 180 and the port ID to which the table 180 is related (of the port for migration in the newly added storage system) to the located management communication I/F address together with a connection check request. As explained with reference to FIG. 19, the connectivity-between-storages management table 180 stores information on connectivity of some port for migration to other ports for migration in different storage systems.

The operation management program 2214 in the newly added storage system 2 requests the connection apparatus 5 to check whether the own port ID for migration informed of can connect to the ports of the other storage systems informed of. This request accompanies the above-described port IDs transmitted to the added storage system.

The management program 422 in the connection apparatus 5 checks connection between the ports for migration informed of. The method thereof is the same as the one in S1005 explained with reference to the flowchart of FIG. 35; for example, it determines the connectivity with reference to the existence of the port ID in the connected equipment management table 400. The management program 422 returns a response about the permission of connection to the storage system 2 (S1112).

The storage system 2 returns the result received from the connection apparatus 5 to the management computer 1. The storage system management program 120 sequentially stores the received results of check in the entries to the fields for the connectivity 1803 in the connectivity-between-storages management table 180 (S1113). The storage system 2 transfers the results to the management computer 1. Although, in this configuration, the connection apparatuses 4, 5 send the connection check results to the management computer 1 via the storage system, they may send the check results to the management computer 1 directly. The management computer 1 may directly instruct the connection apparatuses 4, 5 to check the connection between the host computer 3 and the storage system 2 and the connection between the storage systems 2, respectively.

After confirmation of the normal connection (receiving the check result indicating the normal connection), the storage system management program 121 transmits the default virtual vendor name 1901 for a default virtual vendor name 2002, the default virtual model name 1902 for a default virtual model name 2102, the default virtual serial number 1903 for a default virtual serial number 2202, and the virtual data I/O communication I/F number 1104 for a virtual data I/O communication I/F number 2302. As described above, these default values enable the added storage system to function as a storage system integrated with the other storage systems. The default values may be provided to the added storage system 2 before the connection check.

The operation management program 2214 in the storage system 2 stores the received values to the fields for the default virtual vendor name 2002, the default virtual model name 2102, the default virtual serial number 2202, and the virtual data I/O communication I/F number 2302 (S1115).

The storage system management program 121 stores the assigned values to the default virtual vendor name 1005, the default virtual model name 1006, and the default virtual serial number 1007 in the storage system management table 100, and the virtual data I/O communication I/F number 1104 in the storage system port management table 110, and the process of adding a storage system 2 is terminated (S1114).

In this way, this embodiment can easily add a storage system 2 without stopping services to the host computers 3. The system conducts connection check between storage systems and to the host computers in adding a storage system 2, so that a wiring mistake in installing a storage system (scaling out) can be prevented and an error is prevented from occurring during system operation. Furthermore, the system conducts connection check to achieve reduction in workload of the administrator.

Figure 37:
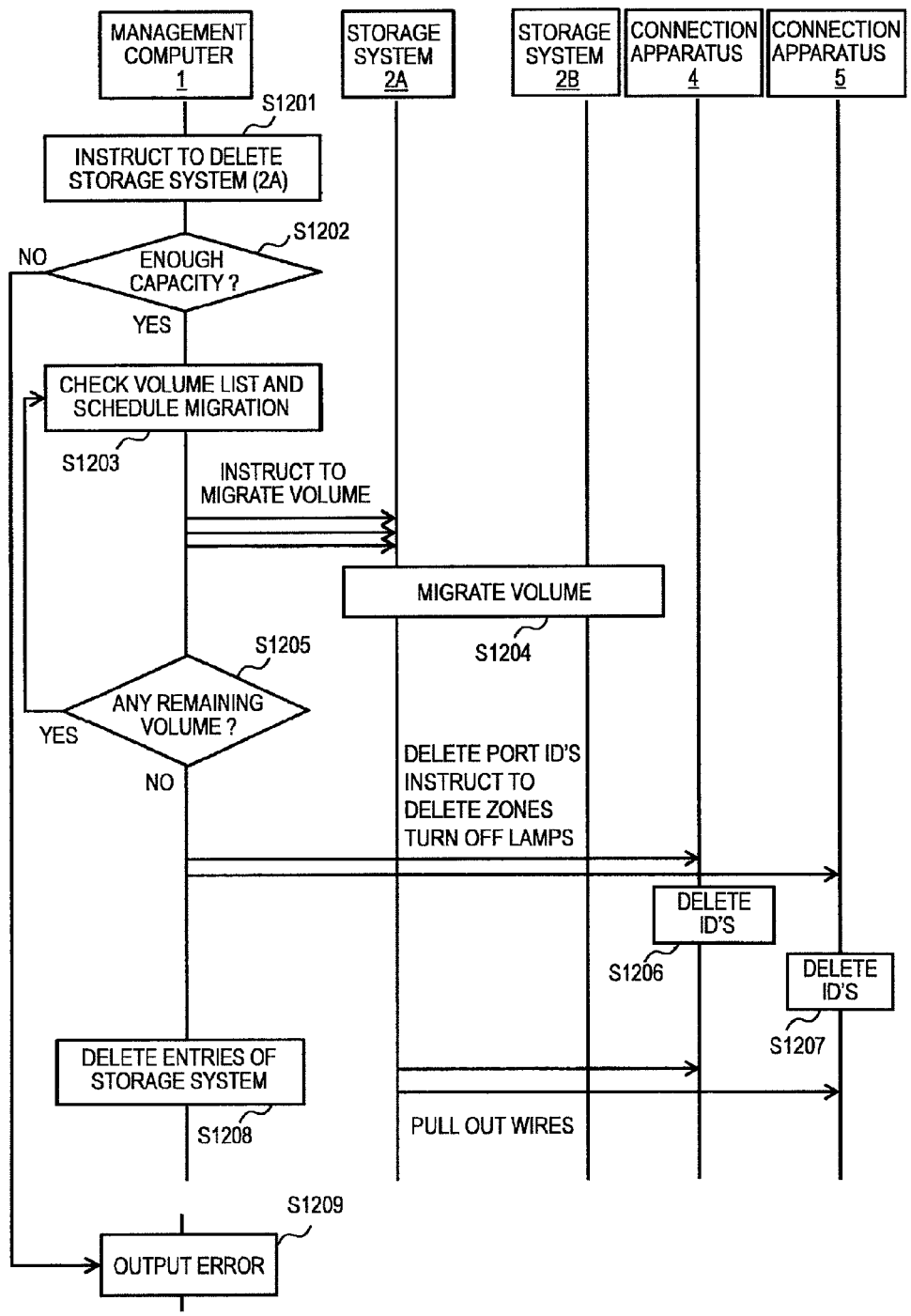
FIG. 37 is a drawing illustrating a flow of deleting a storage system in a computer system in the embodiment.

FIG. 37 is a diagram illustrating a process flow of deleting a storage system 2 in the computer system in this embodiment. This example deletes the storage system 2A from the computer system. First, the administrator issues an instruction to delete the storage system 2A through the operation management program 124 in the management computer 1 (S1201).

The storage system management program 121 in the management computer 1 refers to the storage system usage management table 130 to compare the total amount of the amount of usage 1304 with the total amount of the capacity 1302 of the storage systems except for the storage system 2A to be deleted (S1202). If the total of the amount of usage 1304 is greater (NO at S1202), the operation management program 124 outputs an error to the image output apparatus 18 to terminate the process (S1209).

If the rest of the capacity 1302 is greater (YES at S1202), the storage system management program 121 refers to the virtual storage system volume management table 140, picks up volumes of entries in which the storage system ID 1405 contains the ID of the storage system 2A to be deleted, and sorts them in order from the one having the smallest value in the amount of usage 1403 (S1203). This order is the order of execution of migration.

Various methods of determining the order of migration can be proposed. Values to be referenced may be different from those in this example as long as they are the values that can be obtained at the host computers 3, the connection apparatus 4, and the connection apparatus 5 and that the management computer 1 can collect via the connection apparatus 6.

The storage system management program 121 instructs the storage system 2A to migrate the volumes sequentially in the above-described order of migration. The storage system 2A migrates a designated volume to the storage system 2B (S1204).

The volume management programs 2213 in the storage systems 2A and 2B replicate the data in the target volume in the storage system 2A to a volume in the storage system 2B. The volume management program 2213 in the storage system 2A deletes, and the volume management program 2213 in the storage system 2B adds the relevant entries in the respective volume management tables 240. Furthermore, the program 2213 in the storage system 2A deletes, and the program 2213 in the storage system 2B adds, the corresponding virtual port ID in their respective storage system port management tables 230.

Upon receipt of a notice that migration of a designated volume ends from the storage system 2A, the storage system management program 121 updates the values of the relevant entry in the virtual storage system volume management table 140. Furthermore, it changes the corresponding virtual port ID in the storage system port management table 110 from an entry of the storage system 2A into an entry of the storage system 2B.

The storage system management program 121 refers to the virtual storage system volume management table 140 to check whether an entry (volume) exists or not in which the storage system ID 1405 indicates the storage system 2A (S1205). If any volume remains (YES at S1205), the storage system management program 121 returns to S1203.

If no volume remains (NO at S1205), the connection apparatus management program 122 in the management computer 1 refers to the storage system port management table 110, informs the connection apparatuses 4 and 5 via the connection apparatus 6 of the port ID 1105 and the virtual port IDs 1106, and requests deletion of them.

The management programs 422 in the connection apparatuses 4 and 5 delete the notified port ID 4002 from their connected equipment management tables 400 (S1206, S1207) and change the lamp status 4003 into OFF. Upon detection of the change of the lamp status 4003 into OFF, each management program 422 turns off the link lamp 48. The management program 422 deletes the notified value of the port ID from the column of port ID 4102 in the zone management table 410.

The storage system management program 121 in the management computer 1 deletes entries including the ID of the deleted storage system 2A from the storage system management table 100, the storage system port management table 110, the storage system usage management table 130, the connectivity-from-host management table 170, and the connectivity-between-storages management table 180 (S1208). The administrator pulls out wires for the data I/O communication I/F 45 with the link lamps 48 OFF in the connection apparatuses 4 and 5 to terminate the deletion of the storage system 2A.

As described above, this configuration achieves deletion of a storage system 2 from the computer system without stopping services to the host computers 3. Furthermore, potential of mistakes of manual works in pulling out wires can be reduced.

Figure 38:
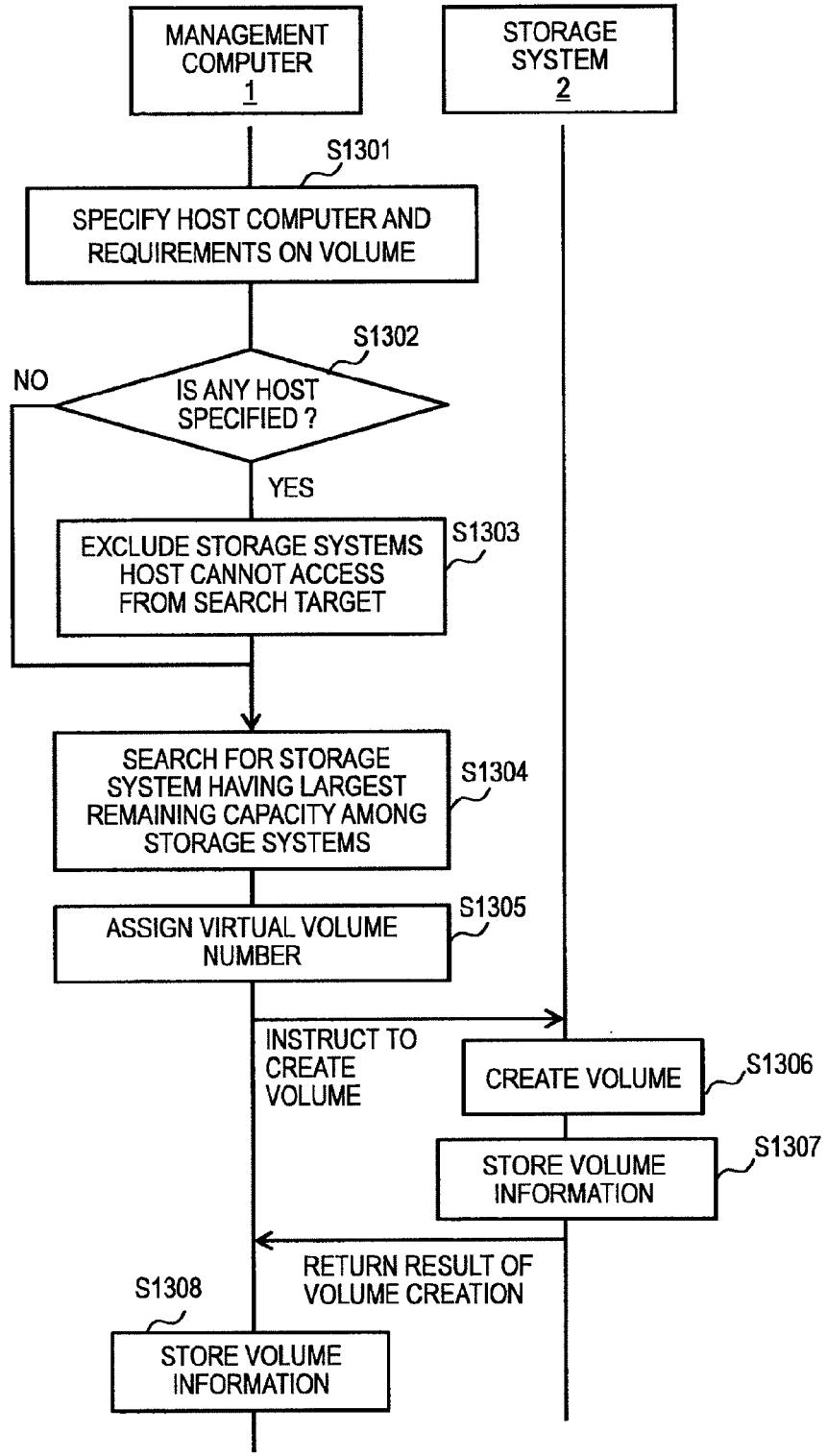
FIG. 38 is a drawing illustrating a flow of creating a normal volume in a computer system in the embodiment.

FIG. 38 is a diagram illustrating a flow of a process of creating a volume in the computer system in this embodiment. In this description, a procedure of creating a volume whose volume type is normal is explained. The administrator inputs an instruction to create a volume through the operation management program 124 in the management computer 1. The administrator inputs the capacity of the volume, the volume type (in the explanation on FIG. 38, normal), and the host computer 3 to be use for to make an instruction to create a volume (S1301).

The storage system management program 121 in the management computer 1 checks whether a host computer 3 to be used for (host ID) is specified or not with reference to the inputted information (S1302). If no host computer 3 is specified (NO at S1302), the procedure proceeds to S1304. If some host computer 3 is specified (YES at S1302), the storage system management program 121 obtains the value of the host-side port ID 1603 from the entry containing the value of the specified host ID 1601 in the host computer management table 160.

The storage system management program 121 searches the column of the port ID 1701 in the connectivity-from-host management table 170 for the obtained value and, out of the matching entry, obtains values of connectable port IDs 1703 (port IDs of storage systems) of entries containing the value "checked" in the connectivity 1704 out of the entries matching the obtained value. This operation prevents trouble caused by no connection.

Next, the storage system management program 121 searches the columns of port ID 1105 and virtual port ID 1106 in the storage system port management table 110 for entries including the obtained port ID and lists the IDs of the storage systems except for the storage systems which do not have a connectable port ID (S1303).

Then, the storage system management table 121 refers to the storage system usage management table 130 with respect to the listed storage systems and selects a storage system of which a value obtained by deducting the amount of usage 1304 from the capacity 1302 is the largest, preferably (S1304). If there is no storage system which has the specified capacity, it is an error.

Various methods of determining the storage system in which a volume is to be created can be proposed. Values to be referenced may be different from those in this example as long as they are the values that can be obtained from the storage systems 2, the host computers 3 and the connection apparatuses 4 and 5 and that the management computer 1 can collect via the connection apparatus 6.

The storage system management program 121 refers to the columns of virtual volume numbers 1401 in the virtual volume management table 140 and assigns a virtual volume number which is not a duplicate to the newly created volume (S1305). Through this operation, the volume is uniquely identified in the computer system. The storage system management program 121 notifies the storage system 2 selected at S1304 of the assigned virtual volume number and the information specified by the administrator and instructs it to create a volume.

The volume management program 2213 in the storage system 2 that receives the instruction selects, for example, a media ID 2701 with which the difference between the capacity 2704 and the amount of usage 2705 is the greatest, creates a volume having the specified size in the media, and updates the media management table 270 (S1306). If there is no media which can store the specified size of volume, it is an error.

The volume management program 2213 adds an entry in the volume management table 240, assigns a volume ID unique in the storage system, stores the capacity, the type, the virtual volume number specified by the management computer 1 in the fields for the capacity 2402, the type 2403, and the virtual volume number 2405, respectively, and further, stores the media ID assigned at S1306 in the field for the media ID 2404.

The volume management program 2213 copies the values of the default virtual vendor name 2202, the default virtual model name 2102, and default virtual serial number 2202 and stores them in the fields for the virtual vendor name 2406A, the virtual model name 2406B, and virtual serial number 2406C (S1307). Through this operation, each storage system 2 can return common (same) storage identification information in responding to a request for volume information from a host computer 3.

The operation management program 2214 in the storage system 2 notifies the management computer 1 of the volume ID 2401 and media ID 2404 on the created volume. The operation management program 124 in the management computer 1 stores information on the created volume in the volume management table 140 to terminate the creation of a volume (S1308).

Figure 39:
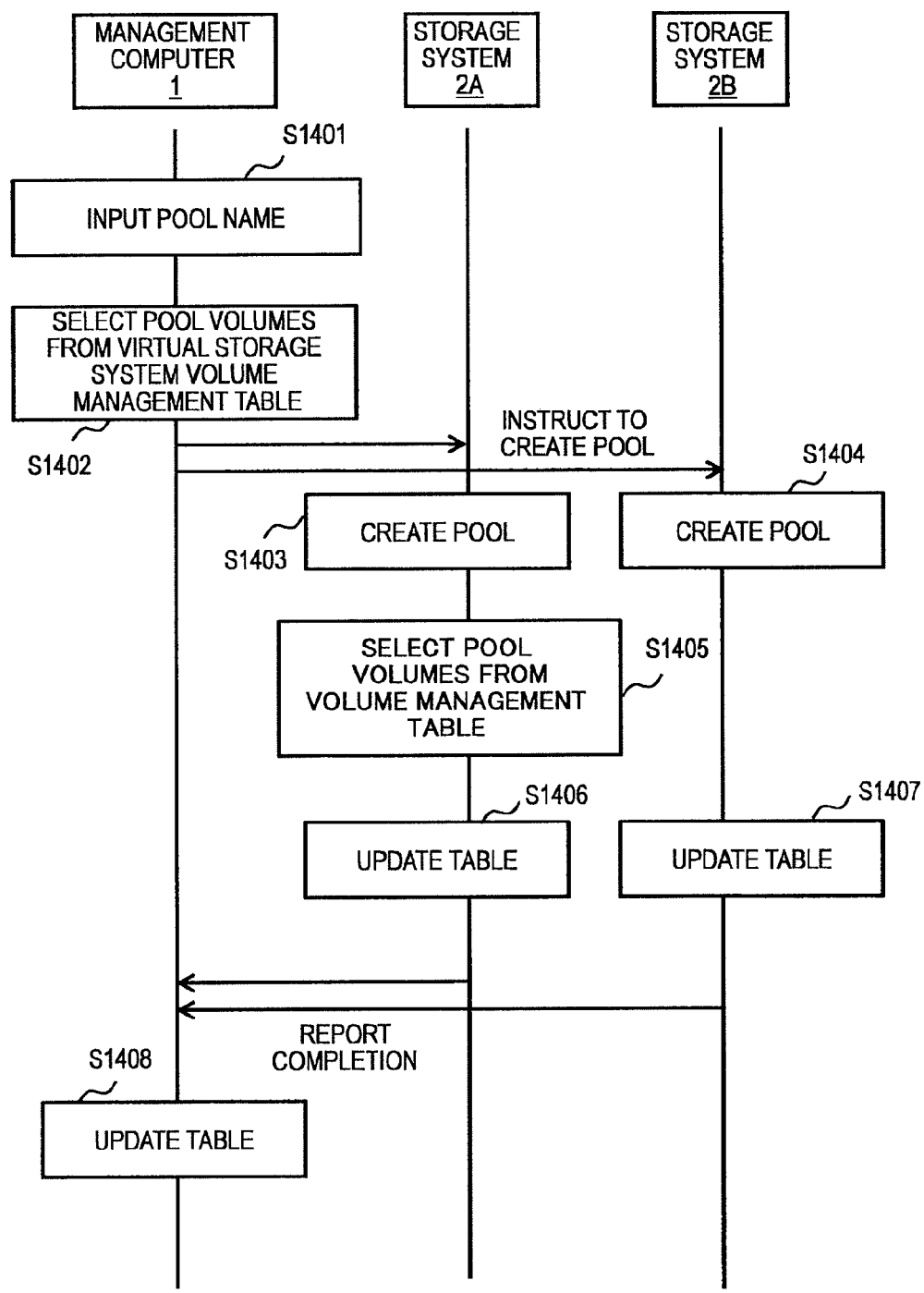
FIG. 39 is a drawing illustrating a flow of creating a thin provisioning pool in a computer system in the embodiment.

FIG. 39 is a diagram illustrating a flow of a process of creating a thin provisioning pool in the computer system in this embodiment. The administrator executes a process of creating a pool while specifying a pool name through the operation management program 124 in the management computer 1. The operation management program 124 adds an entry in the storage system pool management table 120 and stores the specified pool name in the pool name 1201 (S1401).

The administrator refers to the virtual storage system volume management table 140 and selects volumes to be included in the thin provisioning pool using the operation management program 124 (S1402). In this system, volumes can be selected from different storage systems 2. A configuration where a pool includes volumes irrespective of physical boundaries among storage systems achieves more appropriate pool capacity management.

The operation management program 124 transmits an instruction to create a thin provisioning pool to the storage systems 2A and 2B with respect to each selected volume, with reference to the virtual storage system volume management table 140. It transmits the instruction to create a pool even to the storage system 2B which does not have a selected volume.

The pool management program 2212 in the storage system 2A adds an entry to the thin provisioning pool management table 250 and stores the specified pool name to the pool ID 2501 (S1403).

The pool management program 2212 in the storage system 2A searches the virtual volume numbers 2405 in the volume management table 240 for an entry containing the volume specified by the management computer 1 (S1405).

The pool management program 2212 stores the volume ID 2401 of a matching entry to the constituent volume ID 2504 in the thin provisioning pool management table 250; and stores the capacity 2402 to the capacity 2505. The pool management program 2212 divides the added volume into pages, assigns numbers to the pages, and stores a created list of the numbers to the page number 2507. Furthermore, it sets the value "unallocated" to the status 2508 for each page (S1406). Then, the operation management program 2214 transmits a completion report to the management computer 1. The storage system 2B performs the same processes as S1403 and S1406 (S1404 and S1407).

Upon receipt of complete reports from the storage systems 2A and 2B, the storage system management program 121 in the management computer 1 stores information on each storage system in the storage system pool management table 120. Specifically, it stores information on the storage system identified with the storage system ID 1204 to the corresponding entry. The information to be stored is the capacity 1205A of the thin provisioning pool in the storage system, the constituent volume IDs 1207A, and their capacity 1207B. The storage system management program 121 further stores the value obtained by summing the values of the capacities 1205A to the total capacity 1202 and terminates the process of creating a thin provisioning pool (S1408).

Figure 40:
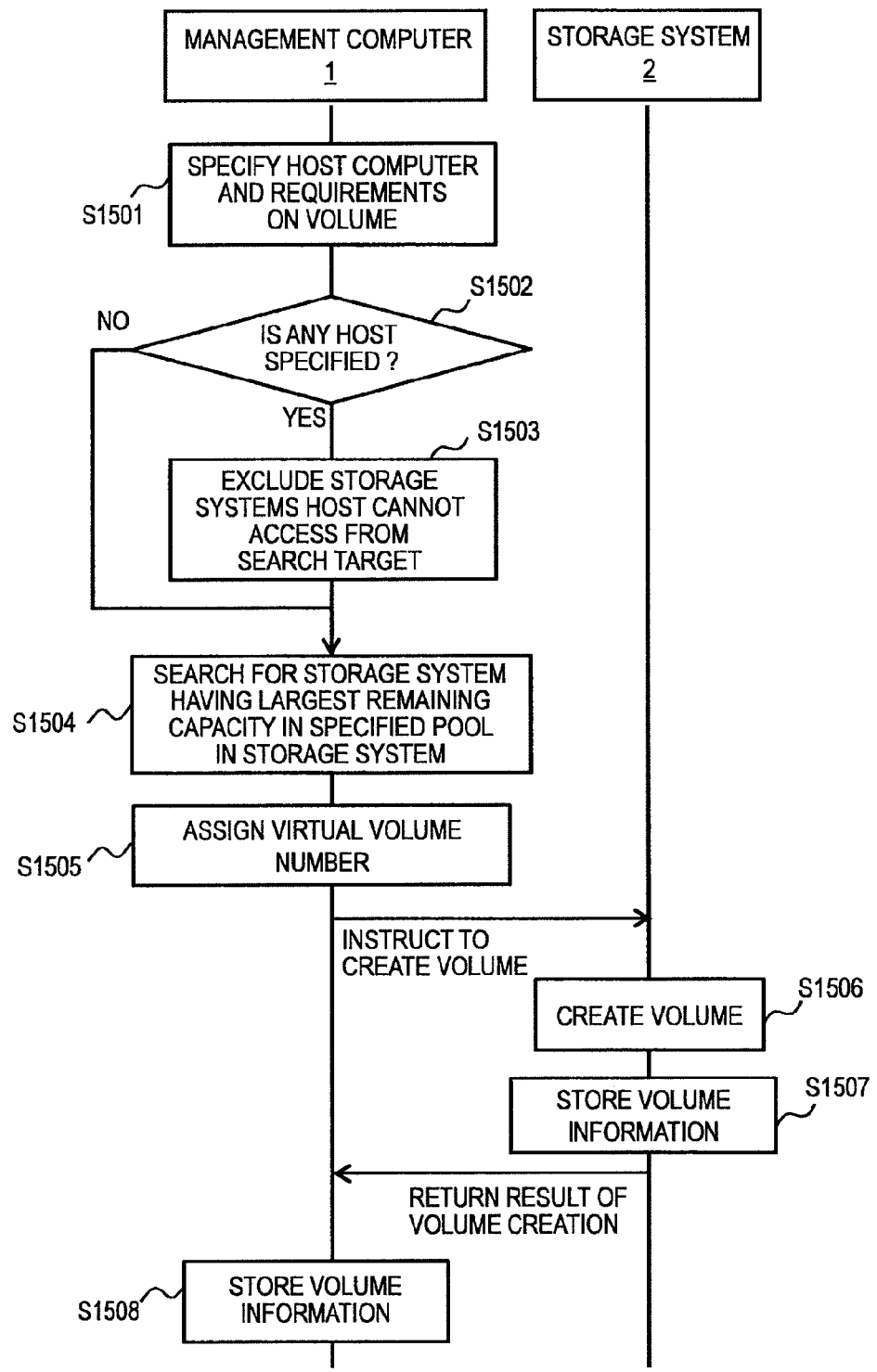
FIG. 40 is a drawing illustrating a flow of creating a thin provisioning volume in a computer system in the embodiment.

FIG. 40 is a diagram illustrating a flow of a process of creating a thin provisioning volume in the computer system in this embodiment. In this description, a procedure of creating a volume whose volume type is thin provisioning will be explained.

The administrator inputs an instruction to create a volume through the operation management program 124 in the management computer 1. The administrator inputs a pool name, the capacity of the volume, the volume type (in the explanation on FIG. 40, thin provisioning), and the host computer 3 to be used for to make an instruction of creation of a volume (S1501).

The storage system management program 121 in the management computer 1 checks whether a host computer 3 to use (access) the volume is specified or not (S1502). If no host computer 3 is specified (NO at S1502), the procedure proceeds to S1504. If some host computer 3 is specified (YES at S1502), the storage system management program 121 obtains the value of the host-side port ID 1603 of the host computer 3 with reference to the host computer management table 160.

The storage system management program 121 searches the port IDs 1701 in the connectivity-from-host management table 170 for the port ID of the specified host computer 3 and obtains port IDs (port IDs of storage systems) of the entries containing the value "checked" in the connectivity 1704 in the connectable port IDs 1703 of the entry matched with the host computer 3.

Next, the storage system management program 121 searches the port IDs 1105 and virtual port IDs 1106 in the storage system port management table 110 for entries including the obtained port IDs to obtain the storage system IDs thereof. The storage system management program 121 lists the storage system IDs except for the storage systems which do not have a connectable port ID (S1503).

Then, the storage system management table 121 refers to the storage system pool management table 120 to locate entries of the listed storage systems with the storage system IDs 1204, and selects a storage system for which the value obtained by deducting the amount of usage 1205B from the capacity 1205A is the greatest, preferably (S1504).

The storage system management program 121 in the management computer 1 refers to the virtual volume numbers 1401 in the virtual storage system volume management table 140 and assigns an unduplicated virtual volume number to the new thin provisioning volume (S1505).

The storage system management program 121 informs the selected storage system 2 of the assigned virtual volume number and information specified by the administrator and instructs the storage system 2 to create the volume.

The volume management program 2213 in the storage system 2 adds an entry to the volume management table 240 in response to the instruction to create a volume. The volume management program 2213 assigns a unique volume ID in the storage system to the new entry and stores the capacity, the type, and the virtual volume number specified by the management computer 1 to the fields for the capacity 2402, the type 2403, and the virtual volume number 2405, respectively (S1506).

The volume management program 2213 copies the values of the default virtual vendor name 2002, the default virtual model name 2102, and the default virtual serial number 2202 and stores them to the fields for the virtual vendor name 2406A, the virtual model name 2406B, and the virtual serial number 2406C, respectively (S1507).

The operation management program 2214 in the storage system 2 reports the values of the volume ID 2401 and the media ID 2404 of the created volume to the management computer 1. The operation management program 124 in the management computer 1 stores the information on the created volume in the volume management table 140 to terminate the process of creating a volume (S1508).

Figure 41:
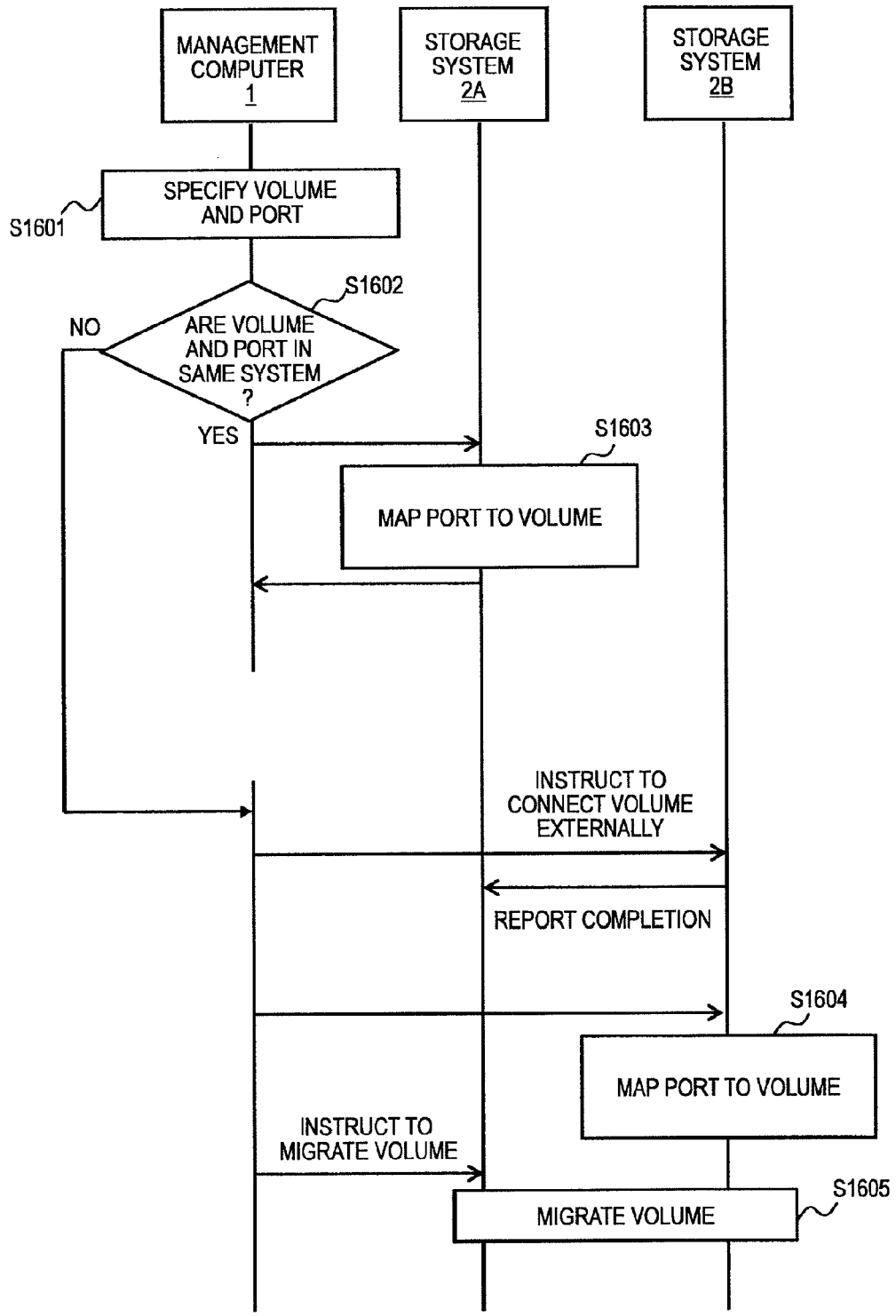
FIG. 41 is a drawing illustrating a flow of setting a port to a volume in a computer system in the embodiment.

FIG. 41 is a diagram illustrating a flow of a process of setting a port to a volume in the computer system in this embodiment. The administrator inputs an instruction to map a port to a volume through the operation management program 124 in the management computer 1.

The volume is selected from the virtual storage system volume management table 140 and is specified with the virtual volume number 1401. The port is selected from entries containing the value "for host" in the use 1103 in the storage system port management table 110 and specified with the virtual data I/O communication IF number 1104. The specified port number is stored in the virtual port number 1408A (S1601) by the operation management program 124. Through it, each storage system 2 can return the common (same) storage identification information in response to a request for volume information from a host computer 3.

The storage system management program 121 checks whether the storage system ID 1405 of the selected volume in the virtual storage system volume management table 140 is the same as the storage system ID 1101 for the selected port in the storage system port management table 110 (S1602).

It they are the same (YES at S1602), the storage system management program 121 transmits an instruction to set a port to the storage system (in this example, the storage system 2A). The volume management program 2213 in the storage system 2A searches the virtual data I/O communication I/F numbers 2302 in the storage system port management table 230 for the specified virtual data I/O communication I/F number to locate the data I/O communication I/F number 2301.

The volume management program 2213 searches the virtual volume numbers 2405 in the volume management table 240 for the specified virtual volume number and stores the value of the data I/O communication I/F number 2301 to the field for a port number 2408A of the entry found. The volume management program 2213 stores the specified data I/O communication I/F number to the field for the virtual port number 2407A and transmits a completion report to the management computer 1 to terminate the mapping of a port to a volume (S1603).

If the storage system of the volume differs from the storage system of the port at S1602 (NO at S1602), the storage system management program 121 uses a known external storage system attachment technique between the storage system 2A including the volume and the storage system (in this example, storage system 2B) including the port (communication interface) to map the volume in the storage system 2A to the storage system 2B. The external storage system attachment technique is described in above PTL 1, for example.

The storage system 2B is provided with the above-described volume by the storage system 2A and processes an access request (a request to read data or write data) to the volume received from a host computer 3. The host computer 3 can read information from or write information to the storage system 2A via the connection apparatus 5 from the storage system 2B.

More specifically, the storage system management program 121 in the management computer 1 notifies the storage system 2B of the port ID and the ID of the target volume (corresponding to the virtual volume number) in the externally connected storage system 2A. The volume management program 2213 in the storage system 2B confirms the connection to the target volume and then adds an entry of the volume to the volume management table 240 to manage it.

The storage system management program 2213 in the storage system 2B receives information on the volume from the volume management program 2213 in the storage system 2A via the connection apparatus 6. Although not shown in FIG. 25, the entry of the volume includes the IDs of the storage system 2A and the port therein. The storage system 2B maps its own port to the above-described volume responsive to the instruction from the management computer 1 in the same way at S1603 (S1604).

In response to an I/O request from a host computer 3 to some volume, the data I/O program 2211 in the storage system 2B refers to the volume management table 240 and if the I/O request is targeted to an external volume (in this example, a volume in the storage system 2A), it transfers the request to the port ID and the volume ID.

The data I/O program 2211 in the storage system 2A which receives the transferred I/O request reads data from the volume or writes data to the volume and returns the result to the storage system 2B. The data I/O program 2211 in the storage system 2B transfers the received result to the host computer 3.

In this way, a host computer 3 in this system can read or write a volume in a storage system via an interface in a different storage system. Since the host computer 3 locates the volume with the same volume identification information and storage identification information, it does not concern which storage system the volume is located.

Furthermore, to reduce the amount of traffic in the connection apparatus 5, the storage system management program 121 may copy information on the specified volume to a volume in the storage system 2B to migrate the volume (S1605).

Figure 42:
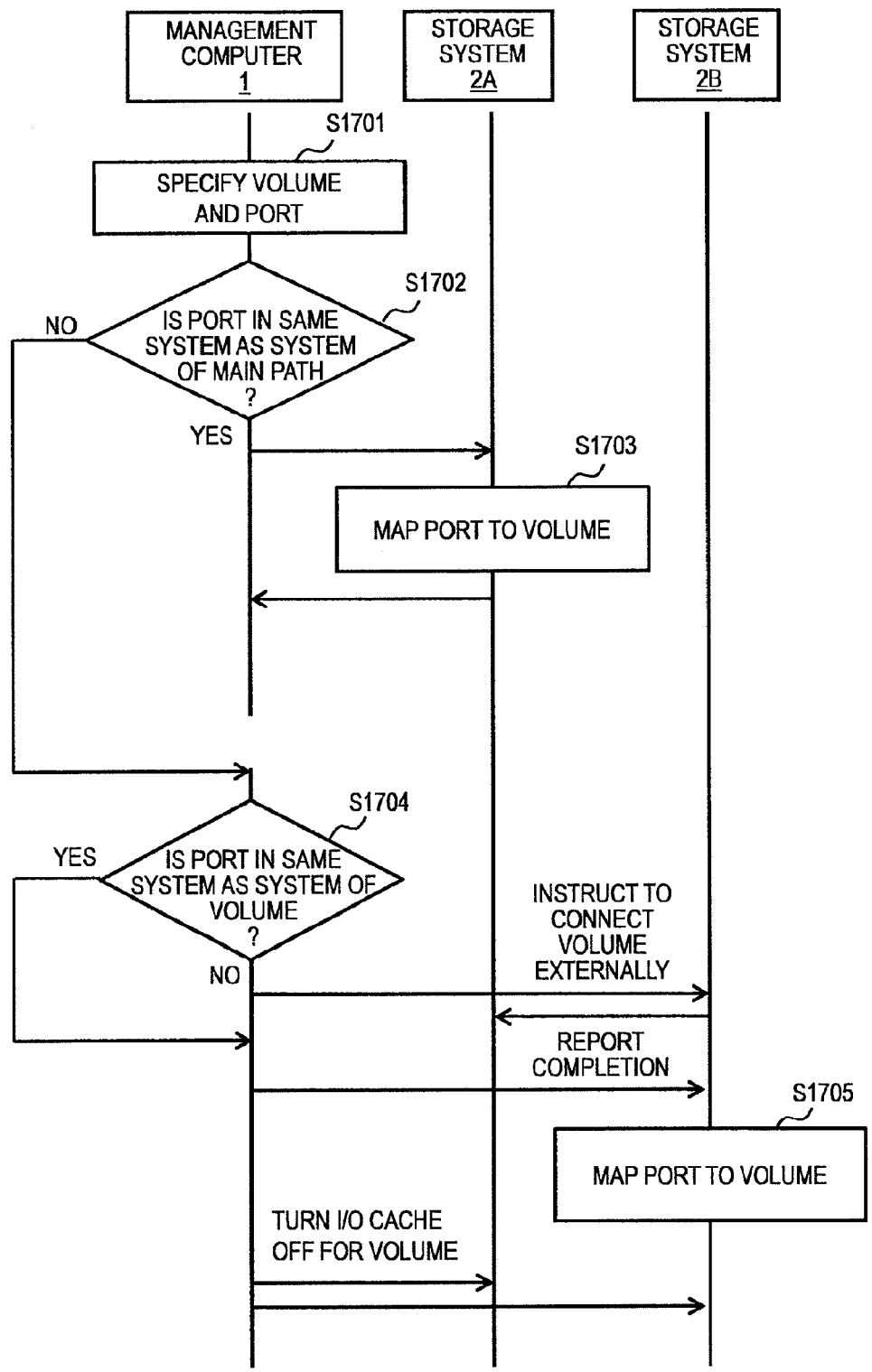
FIG. 42 is a drawing illustrating a flow of setting an alternate path to a volume in a computer system in the embodiment.

FIG. 42 is a diagram illustrating a flow of setting a port for an alternate path to a volume in the computer system in this embodiment. The administrator inputs an instruction to map a port for an alternate path to a volume through the operation management program 124 in the management computer 1. The volume is selected from the virtual storage system volume management table 140 and specified with a virtual volume number 1401.

The port is selected from entries containing the value "for host" in the use 1103 in the storage system port management table 110 and specified with a virtual data I/O communication I/F number 1104. The specified port number is stored in the alternate virtual port number 1408B by the operation management program 124 (S1701).

The storage system management program 121 searches the virtual data I/O communication I/F numbers 1104 in the storage system port management table 110 for the virtual port number 1408A and the alternate virtual port number 1408B in the virtual storage system volume management table 140 for the selected volume and determines whether the storage system 2 of the virtual port and the storage system 2 of the alternate virtual port are the same or not (S1702).

If they are the same (YES at S1702), the storage system management program 121 transmits an instruction to set an alternate port to the storage system 2A. The volume management program 2213 in the storage system 2A searches the virtual data I/O communication I/F numbers 2302 in the storage system port management table 230 for the specified virtual data I/O communication I/F number and locates the data I/O communication I/F number 2301.

The volume management program 2213 searches the virtual volume numbers 2405 in the volume management table 240 for the specified virtual volume number and stores the value of the data I/O communication I/F number 2301 to the alternate port number 2408B in the entry found. Furthermore, it stores the specified virtual data I/O communication I/F number to the alternate virtual port number 2407B and transmits a completion report to the management computer 1 to terminate the mapping of the port to the volume (S1703).

If the two values are not the same at S1702 (NO at S1702), the storage system management program 121 determines whether the storage system ID 1405 of the selected volume in the virtual storage system volume management table 140 is the same as the storage system ID 1101 of the selected port in the storage system port management table 110 (S1704).

If the volume and the port belong to different storage systems (NO at S1704), the storage system management program 121 instructs the storage system 2B to set up a configuration between the storage system 2A including the volume and the storage system 2B including the alternate port where the storage system 2B can read or write information in the storage system 2A via the connection apparatus 5 using the external storage system technique.

The volume management program 2213 in the storage system 2B sets the selected volume in the storage system 2A to be regarded as a volume in the storage system 2B as explained with reference to FIG. 41. If the volume and the port belong to the same storage system (YES at S1704), the external connection between the storage systems 2A and 2B is skipped. The volume management program 2213 in the storage system 2B then maps its own port to the volume provided by the storage system 2A (S1705).

In this connection, the storage system 2A has a cache memory 21 different from that of the storage system 2B. If I/Os for read or write occur from a plurality of ports, data will be corrupted because of the problem of cache coherency. Accordingly, the cache function should be turned off. The storage system management program 121 instructs the storage systems 2A and 2B to turn the cache off for the relevant volumes.

Each of the operation management programs 2214 in the storage systems 2A and 2B changes the value of the cache allowability 2409 in the volume management table 240 into "unallowable". In the subsequent I/O processing, when the data I/O program in each storage system refers to the volume, it processes data I/Os without using the cache memory since the value of the cache allowability 2409 is "unallowable".

As described above, if the volume and the port belong to the same storage system at S1704 (YES at S1704), the mapping of the volume in the storage system 2A to the storage system 2B is omitted and the value of the cache allowability 2409 for the volume should remain "allowable".

Figure 43:
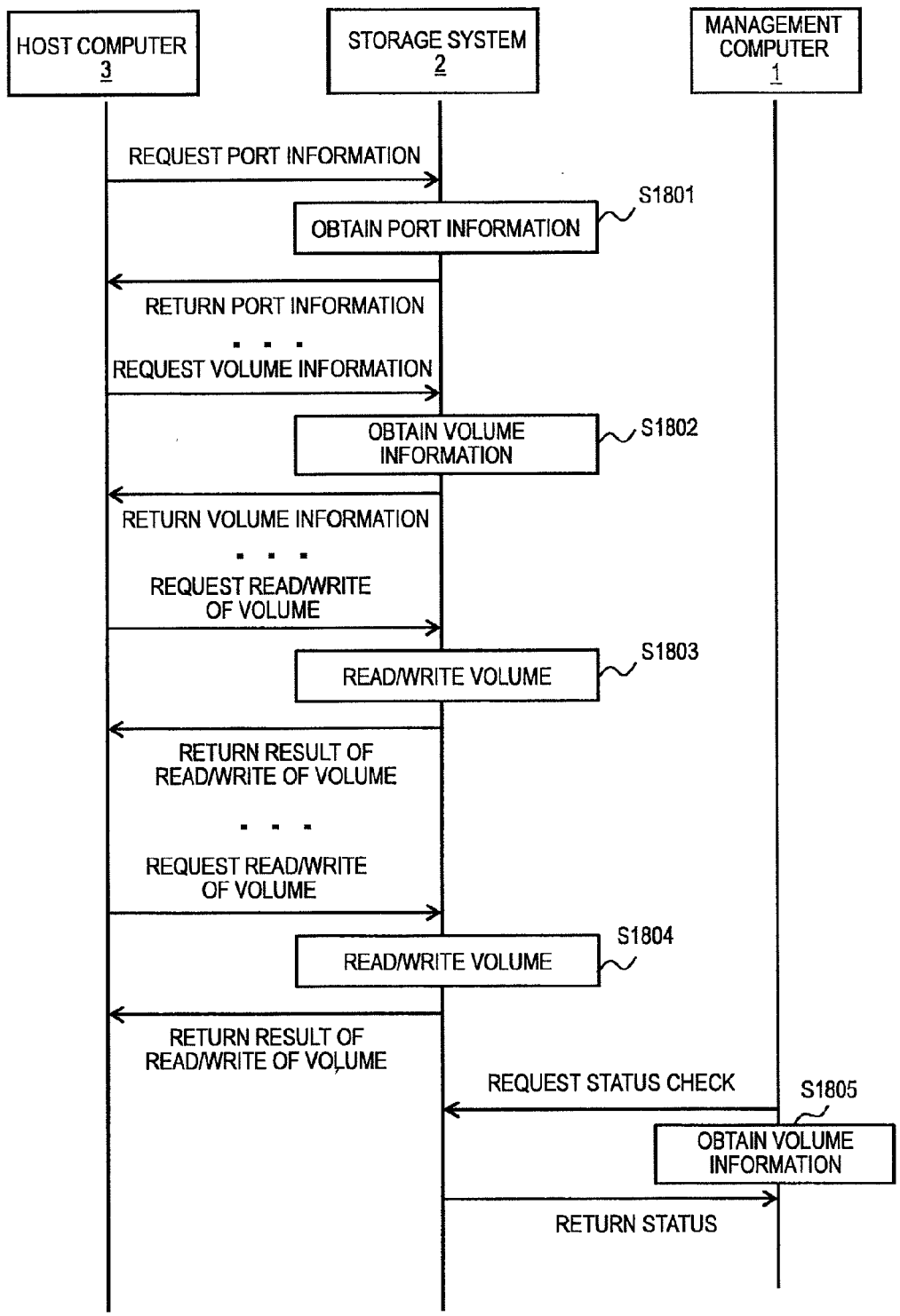
FIG. 43 is a drawing illustrating a flow of processing an I/O request from a host computer in a computer system in the embodiment.

FIG. 43 is a diagram illustrating a flow of processing a data I/O (data write/read) request from a host computer 3 in the computer system in this embodiment. The operating system 323 in a host computer 3 locates a volume with reference to the connected storage system's volume management table 300 and transmits a data I/O request to the storage system 2. The data I/O request includes a read/write request of user data, and in addition, an I/O request of other information such as port information and volume information.

The flowchart of FIG. 43 includes requesting information on a port, requesting information on a volume, and reading or writing user data, but usually, these processes are not executed in series. A host computer 3 obtains port information and volume information at predetermined times (for example, periodically) to locate a volume using the information. The port information and the volume information do not need to be obtained every reading or writing of user data.

The operating system 323 of a host computer 3 transmits a port information request to each port of each storage system 2 at a predetermined time. The data I/O program 2211 in the storage system 2 that receives the request searches the data I/O communication I/F numbers 2301 in the storage system port management table 230 for the number of its own data I/O communication I/F 25 that receives the request and obtains the information in the matched entry.

The data I/O program 2211 returns the value of the virtual data I/O communication I/F number 2302 as the port number, the value of the default virtual vendor name 2002 as the vendor name, the value of the default virtual model names 2102 as the model name, and the value of the default serial number 2202 as the serial number (S1801).

The operating system 323 in the host computer 3 transmits a volume information request with a volume ID to each port of each storage system 2. The data I/O program 2211 in the storage system 2 that receives the request searches the virtual volume numbers 2405 in the volume management table 240 for the volume ID received with the request and returns the virtual model names 2406B and the virtual serial numbers 2406C in the matching entry to the host computer 3 (S1802).

In this way, this system is configured to return the default storage identification information to the host computer 3, so that the host computer 3 can read and write a volume regardless of the storage system where the volume exists.

The operating system 323 in a host computer 3 requests a read or a write of a volume. The data I/O program 2211 in the storage system 2 searches the volume management table 240 for the received volume ID and refers to the value of the cache allowability 2409 in the matching entry. If the value indicates that caching is allowable, the data I/O program 2211 processes the I/O using the cache memory; if unallowable, it processes the I/O without using the cache memory.

If the storage area is short to write to a thin provisioning volume 224, the data I/O program 2211 refers to the thin provisioning management table 250 to search for a page with the value "unallocated" contained in a field of the status 2508, and allocates the page. It adds a constituent volume ID 2605 and a page number 2606 in the entry including the volume ID 2601 in the thin provisioning volume management table 260 and adds a page size to the amount of usage (S1803, S1804).

The management computer 1 sends a status check request to each storage systems 2 at constant intervals, obtains use of the storage systems and use of the volumes, and updates the internal management tables. This procedure has already been described.

Figure 44:
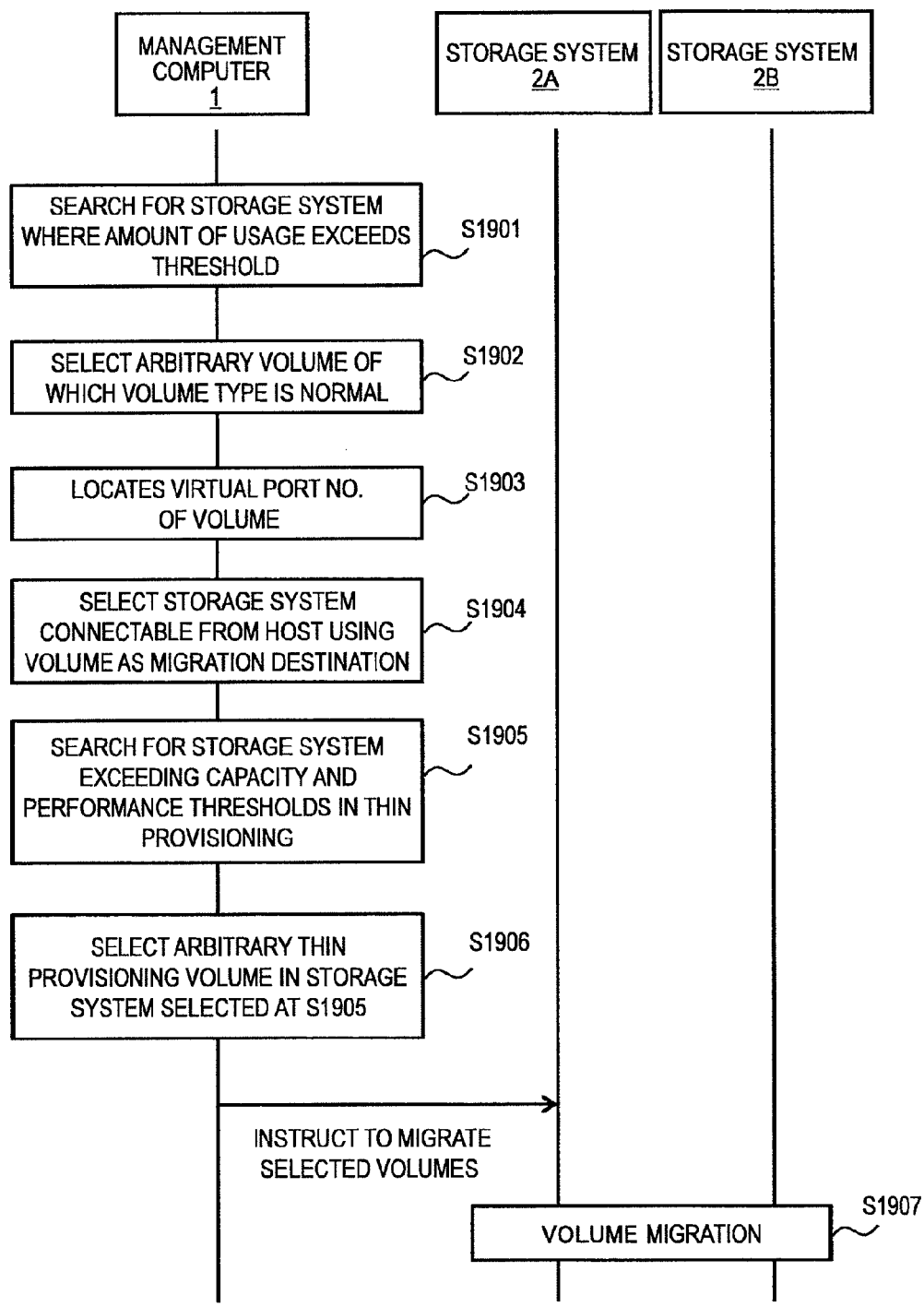
FIG. 44 is a drawing illustrating a flow of leveling resources in a computer system in the embodiment.

FIG. 44 is a diagram illustrating a process flow of leveling the resources in the computer system in this embodiment. The storage system management program 121 in the management computer 1 searches for a target volume of migration. Specifically, referring to the storage system usage management table 130, it searches for an entry in which the percentage of the amount of usage 1304 to the total capacity 1302 exceeds the capacity threshold 1303 in each storage system ID 1301 (S1901).

If such a storage system 2A exists that the percentage of the amount of usage is more than the capacity threshold, the storage system management program 121 searches the storage system IDs 1405 in the virtual storage system volume management table 140 for an entry containing the storage system ID. The storage system management program 121 selects an arbitrary volume from the entries containing the value "normal" in the volume type 1404 in the volumes of the matching entry as a migration target (S1902).

The storage system management program 121 selects a storage system which has remaining capacity enough for migration of the selected volume and is accessible by a host computer 3 that accesses the selected volume as the migration destination storage system 2B. This configuration definitely prevents a trouble that a host computer 3 is inaccessible to the volume. If a plurality of storage systems exist that satisfy these requirements, it is preferable to select the storage system having the least amount of usage 1304.

For example, the storage system management program 121 uses the following method to find a storage system to which a host computer 3 can connect. The storage system management program 121 locates a virtual port number 1408A that connects to the selected volume with reference to the virtual storage system volume management table 140 and locates a port ID 1105 or a virtual port ID 1106 associated with the virtual port number with reference to the storage system port management table 110 (S1903).

The storage system management program 121 further locates a port ID 1701 of the host computer 3 that connects to the located port or virtual port with reference to the host connectivity management table 170. A storage system having a port ID included in the column of the connectable port IDs 1703 for the located port ID 1701 in the host connectivity management table 170 is selected as the migration destination (S1904).

The storage management program 121 further searches the storage system pool management table 120 for an entry of which the percentage of the amount of usage 1205B to the capacity 1205A exceeds the capacity threshold 1205C and obtains the storage system ID of the entry. In addition, the storage system management program 121 searches for an entry of which the value of the IOPS 1206A exceeds the performance threshold 1206B and obtains the storage system ID of the entry (S1905).

The storage system management program 121 searches the storage system IDs 1405 in the virtual storage system volume management table 140 for entries of the storage system of which the amount of usage or the IOPS exceeds the threshold. In the volumes of the storage system (entries), it selects an arbitrary volume from the entries containing the value "thin provisioning" in the volume type 1404 as a migration target (S1906).

The storage system management program 121 selects a storage system that has remaining capacity enough for the selected volume to be migrated and is accessible by a host computer 3 that accesses the selected volume as the migration destination storage system 2B. If a plurality of storage systems exist that satisfy these requirements, the program 121 selects the storage system having the least amount of usage 1304. The method of selecting a migration destination accessible by the host computer 3 is the same as the above-described migration method for a normal volume.

The storage systems 2A and 2B conduct migration of the selected volumes from the storage system 2A to the selected migration destination storage system 2B (S1907). The method of migration has been described above.

Through this process, the resources in the storage systems are leveled to achieve load balancing. Furthermore, automatic migration to a storage system 2 accessible by a host computer 3 is achieved.

Figure 45:
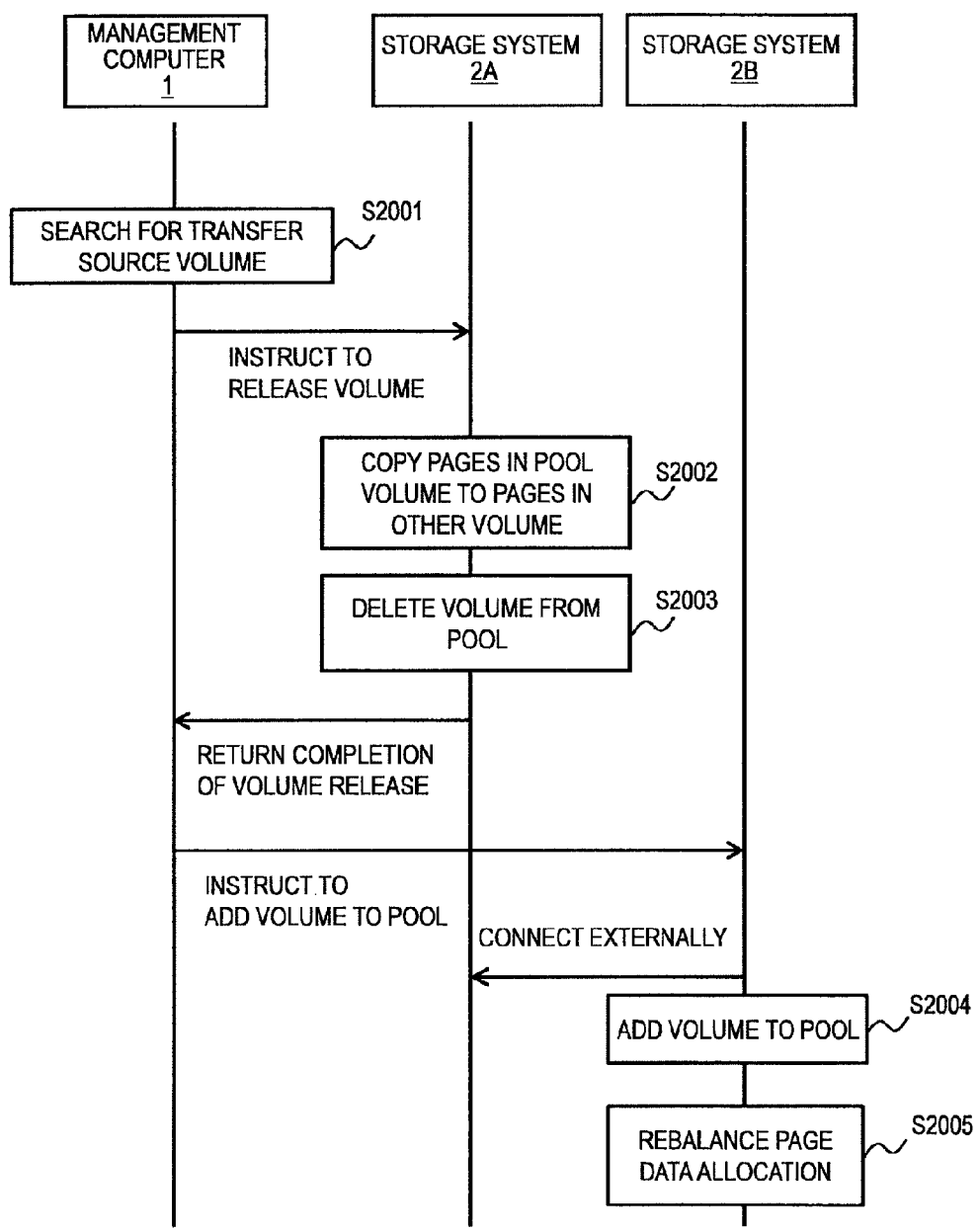
FIG. 45 is a drawing illustrating a flow of adjusting the capacity of a thin provisioning pool in a computer system in the embodiment.

FIG. 45 is a drawing illustrating a flow of a process of adjusting the capacity of a thin provisioning pool in the computer system in this embodiment. In a computer system in which a plurality of storage systems configure a virtual storage system, volumes created for thin provisioning under management are allocated pages from the volumes (constituent volumes) that constitute thin provisioning pools in the storage systems and store data written from host computers 3.

In this process, the amount of data and the frequency of writing from host computers 3 are different in every volume, so that the remaining capacities of the storage systems 2 in a thin provisioning pool change with time, resulting in variation between the capacities.

In this computer system, the administrator manages the total amount and the amount of usage of a pool using the storage system pool management table 120 in the management computer 1; even if some storage system becomes in short of the capacity because a volume in the storage system is frequently written, there are storage systems having sufficient remaining capacities in the entire pool, so that the capacities can be transferred.

Meanwhile, for capacity management using the total capacity 1202 and the amount of usage 1203 in the storage system pool management table 120, transfer of capacities among the storage systems is necessary. Now with reference to FIG. 45, a flow of capacity transfer will be described where the capacity of a thin provisioning pool in the storage system 2B is short and the storage system 2A has a sufficient remaining capacity.

In the process explained with FIG. 44, the storage system management program 121 calculates the amount of usage 1205B in relation to the capacity 1205A every storage system ID 1204 in the storage system pool management table 120. For example, if there is a storage system of which the percentage of the amount of usage 1205B to the capacity 1205A exceeds the capacity threshold 1205C, the computer system performs reconfiguration of constituent volumes of a thin provisioning pool.

If such a storage system 2B exists in a pool, the storage system management program 121 selects the ID 1204 of a storage system 2A in which the percentage of the amount of usage 1205B to the capacity 1205A is the lowest in the pool (pool name 1201), for example.

The storage system management program 121 further selects an arbitrary volume from the constituent volume IDs 1207A in the selected storage system 2A and instructs the selected storage system 2A to release the volume from the thin provisioning pool volumes (S2001).

To remove the designated volume from the thin provisioning pool, the pool management program 2212 of the storage system 2A refers to the thin provisioning pool management table 250 and copies the data of the page numbers 2507 of the constituent volume ID 2504 for the pool ID 2501 to another constituent volume. Moreover, it changes the constituent volume IDs 2605 and the page numbers 2606 in the thin provisioning volume management table 260, and changes the status 2508 from "allocated" to "unallocated" (S2002).

When all of the statuses 2508 of the volumes are changed into "unallocated", the pool management program 2212 deletes the entry of the volume and reduces the capacity 2505 of the constituent volume from the total capacity 2502 (S2003).

Upon receipt of a management return of releasing a volume from the storage system 2A, the storage system management program 121 in the management computer 1 instructs the storage system 2B in short of the capacity to connect to the volume deleted at S2003 using an external storage system technique. The method of providing a volume from the storage system 2A to 2B using the external storage system technique is the same as the method explained with reference to FIG. 41.

The storage system 2B can read or write the same volume of the storage system 2A like the own volumes in itself. The storage system 2B adds the volume provided by the storage system 2A to the thin provisioning pool as its own volume. The pool management program 2212 in the storage system 2B registers the volume in the thin provisioning management table 250 with a new constituent volume ID (S2004).

Thereafter, to balance the allocation state within the same pool in the thin provisioning pool management table 250 the pool management program 2212 in the storage system 2B may copy data to the pages of the added volume and rewrites the constituent volume IDs 2605 and its page numbers 2606 in the thin provisioning volume management table 260 (S2005), in addition to allocating a new page for a new write request when using the newly added constituent volume.

As described above, this process incorporates a pool volume in a different storage system if some storage system providing a pool volume becomes in short of the capacity. This configuration achieves appropriate management of the capacity of a pool irrespective of physical boundaries among storage systems.

As set forth above, this invention has been described in detail with reference to the accompanying drawings. However, this invention is not limited to the specific configurations but includes various modifications and equivalent configurations within the scope of the appended claims. A part of the configurations in this embodiment may be added, deleted, or replaced with those in the other configurations. For example, it is preferable that the system conduct connection check on the apparatuses but this process may be omitted. It is also preferable that the system include all of the above-described functions such as the thin provisioning volume function and the external storage system function, but the system may include a part of these functions.

All of the storage systems included in the computer system preferably have the common default storage system identification information and only a part of the storage systems may have the default storage system identification information. The above-described configurations and functions, for all or a part of them, may be implemented by hardware obtained by designing integrated circuits, for example. The information of programs, tables, and files to implement the functions may be stored in a storage device such as a non-volatile semiconductor memory, a hard disk drive, or an SSD, or a computer-readable non-transitory data storage medium such as an IC card, an SD card, or a DVD.

The invention claimed is:

1. An information storage system comprising a plurality of storage systems and a management system, wherein:
   the management system is configured to:
      manage connection information between the plurality of storage systems and a plurality ports of a host computer, and manage capacity information of the plurality of storage systems;
      identify a port, which is connected to a migration target volume of a migration source storage system in the plurality of the storage systems, in the plurality of ports of the host computer on the basis of the connection information; and
      select a migration destination storage system, which is able to be connected to the identified port of the host computer and has remaining capacity for the migration target volume of the migration source storage system, in the plurality of storage systems on the basis of the connection information and the capacity information, and
   wherein data of the migration target volume is migrated from the migration source storage system to the selected migration destination storage system.

2. The information storage system according to claim 1, wherein when the migration destination storage system receives a request from the host computer to the migration target volume provided by the migration source storage system, the migration destination storage system is configured to transfer the request to the migration source storage system,
   wherein the migration source storage system is configured to receive the transferred request and send the result of the request to the migration destination storage system, and
   wherein the migration destination storage system is configured to transfer the result of the request to the host computer.

3. The information storage system according to claim 1, wherein the management system is configured to select the migration source storage system in the plurality of the storage system on the basis of the capacity information, and
   wherein a ratio of usage capacity in the migration source storage system exceeds a predetermined threshold value.

4. The information storage system according to claim 1, wherein the management system is configured to select the migration source storage system in the plurality of the storage system on the basis of the capacity information, and
   wherein a ratio of usage capacity in a storage pool formed by storage devices in at least one storage system including the migration source storage system exceeds a predetermined threshold value.

5. A management system managing a plurality of storage systems, comprising:
a controller and
a memory storing connection information between the plurality of storage systems and a plurality ports of a host computer, and manage capacity information of the plurality of storage systems,
wherein the controller is configured to:
manage identify a port, which is connected to a migration target volume of a migration source storage system in the plurality of the storage systems, in the plurality of ports of the host computer on the basis of the connection information; and
select a migration destination storage system, which is able to be connected to the identified port of the host computer and has remaining capacity for the migration target volume of the migration source storage system, in the plurality of storage systems on the basis of the connection information and the capacity information, and
instruct a data migration for the migration target volume between the migration source storage system and the selected migration destination storage system.

* * * * *